(12) United States Patent
Fukai et al.

(10) Patent No.: US 6,643,415 B1
(45) Date of Patent: Nov. 4, 2003

(54) METHOD AND APPARATUS FOR ROTATING IMAGE DATA

(75) Inventors: Toshiaki Fukai, Tokyo (JP); Shigetaka Ogawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/237,252

(22) Filed: Jan. 26, 1999

(30) Foreign Application Priority Data

Jan. 29, 1998 (JP) ............................................. 10-033858

(51) Int. Cl.$^7$ ................................................. G06K 9/32
(52) U.S. Cl. ......................... 382/296; 358/2.1; 358/445; 345/502; 345/659
(58) Field of Search ................................. 382/216, 235, 382/232, 296, 297, 289, 300, 345; 358/1.2, 1.15, 1.16, 1.9, 3.8, 284, 296, 456, 443, 501, 451, 520, 426.03, 426.07, 534, 527, 404; 340/37, 146, 167, 168, 333.6, 583

(56) References Cited

U.S. PATENT DOCUMENTS

| | | | | |
|---|---|---|---|---|
| 4,712,141 A | * | 12/1987 | Tomohisa et al. | 358/445 |
| 4,831,368 A | * | 5/1989 | Masimo et al. | 345/659 |
| 5,263,135 A | * | 11/1993 | Dei | 345/502 |
| 5,768,403 A | * | 6/1998 | Suzuki et al. | 358/2.1 |
| 5,982,508 A | * | 11/1999 | Kashihara | 358/3.03 |

FOREIGN PATENT DOCUMENTS

| | | |
|---|---|---|
| JP | 5-108812 | 4/1993 |
| JP | 6-105118 | 4/1994 |
| JP | 7-320053 | 12/1995 |
| JP | 8-331368 | 12/1996 |
| JP | 10-136195 | 5/1998 |

OTHER PUBLICATIONS

2244 Research Disclosure "90 Degrees Rotation of a Bit-Map", no. 378, pp. 673/674, (Oct. 1, 1995) XPO00549137.

* cited by examiner

Primary Examiner—Jayanti K. Patel
Assistant Examiner—Abolfazl Tabatabai
(74) Attorney, Agent, or Firm—Foley & Lardner

(57) ABSTRACT

An image memory is used for rotation of image data, and to shorten processing time. An image data rotating method uses an image memory capable of storing n×n pixels, and, for consecutive two pages in image data with the same size of a plurality of pages to be rotated, reads image data in a former page written in said image memory from each storage area at each address of said image memory in a predetermined order of reading according to the angle of 90 degrees to be rotated every k pixels for one line and every k lines for all lines; and writes image data in the latter page in the same storage area at the same address of said image memory in the predetermined order.

23 Claims, 25 Drawing Sheets

| 00 | 01 | 02 | 03 | 04 | 05 | 06 | 07 | 08 | 09 | 0A | 0B | 0C | 0D | 0E | 0F |
|---|---|---|---|---|---|---|---|---|---|---|---|---|---|---|---|
| 10 | 11 | 12 | 13 | 14 | 15 | 16 | 17 | 18 | 19 | 1A | 1B | 1C | 1D | 1E | 1F |
| 20 | 21 | 22 | 23 | 24 | 25 | 26 | 27 | 28 | 29 | 2A | 2B | 2C | 2D | 2E | 2F |
| 30 | 31 | 32 | 33 | 34 | 35 | 36 | 37 | 38 | 39 | 3A | 3B | 3C | 3D | 3E | 3F |
| 40 | 41 | 42 | 43 | 44 | 45 | 46 | 47 | 48 | 49 | 4A | 4B | 4C | 4D | 4E | 4F |
| 50 | 51 | 52 | 53 | 54 | 55 | 56 | 57 | 58 | 59 | 5A | 5B | 5C | 5D | 5E | 5F |
| 60 | 61 | 62 | 63 | 64 | 65 | 66 | 67 | 68 | 69 | 6A | 6B | 6C | 6D | 6E | 6F |
| 70 | 71 | 72 | 73 | 74 | 75 | 76 | 77 | 78 | 79 | 7A | 7B | 7C | 7D | 7E | 7F |
| 80 | 81 | 82 | 83 | 84 | 85 | 86 | 87 | 88 | 89 | 8A | 8B | 8C | 8D | 8E | 8F |
| 90 | 91 | 92 | 93 | 94 | 95 | 96 | 97 | 98 | 99 | 9A | 9B | 9C | 9D | 9E | 9F |
| A0 | A1 | A2 | A3 | A4 | A5 | A6 | A7 | A8 | A9 | AA | AB | AC | AD | AE | AF |
| B0 | B1 | B2 | B3 | B4 | B5 | B6 | B7 | B8 | B9 | BA | BB | BC | BD | BE | BF |
| C0 | C1 | C2 | C3 | C4 | C5 | C6 | C7 | C8 | C9 | CA | CB | CC | CD | CE | CF |
| D0 | D1 | D2 | D3 | D4 | D5 | D6 | D7 | D8 | D9 | DA | DB | DC | DD | DE | DF |
| E0 | E1 | E2 | E3 | E4 | E5 | E6 | E7 | E8 | E9 | EA | EB | EC | ED | EE | EF |
| F0 | F1 | F2 | F3 | F4 | F5 | F6 | F7 | F8 | F9 | FA | FB | FC | FD | FE | FF |

| ROTATION ANGLE | FLOW OF CONTROL PROCEDURE | | | | | |
|---|---|---|---|---|---|---|
| | 1ST PAGE | 2ND PAGE | 3RD PAGE | 4TH PAGE | 5TH PAGE | ... |
| 90° | PROCEDURE 1→PROCEDURE 2→PROCEDURE 3→PROCEDURE 4→PROCEDURE 1→... | | | | | |
| 180° | PROCEDURE 1→PROCEDURE 3→PROCEDURE 1→PROCEDURE 3→PROCEDURE 1→... | | | | | |
| 270° | PROCEDURE 1→PROCEDURE 4→PROCEDURE 3→PROCEDURE 2→PROCEDURE 1→... | | | | | |

| FLOW OF CONTROL PROCEDURE (COMPATIBLE FOR NO ROTATION AND 180°) | | | | | |
|---|---|---|---|---|---|
| | 1ST PAGE | 2ND PAGE | 3RD PAGE | 4TH PAGE | 5TH PAGE |
| PROCEDURE | PROCEDURE 1 → | PROCEDURE 1 → | PROCEDURE 1 → | PROCEDURE 3 → | PROCEDURE 1 →... |
| OUTPUT IMAGE | NO OUTPUT → | NO ROTATION → | 180° → | NO ROTATION → | 180° ↑... |

FIG.29

| FLOW OF CONTROL PROCEDURE (COMPATIBLE FOR 90° AND 270°) | | | | | |
|---|---|---|---|---|---|
| | 1ST PAGE | 2ND PAGE | 3RD PAGE | 4TH PAGE | 5TH PAGE |
| PROCEDURE | PROCEDURE 1 → | PROCEDURE 2 → | PROCEDURE 1 → | PROCEDURE 2 → | PROCEDURE 1 →... |
| OUTPUT IMAGE | NO OUTPUT → | 90° ↑ | 270° ↑ | 90° ↑ | 270° ↑... |

FIG.30

METHOD AND APPARATUS FOR ROTATING IMAGE DATA

BACKGROUND OF THE INVENTION

1. Field of the Invention

The present invention relates to a method and apparatus for rotating image data, and, more particularly, to a method and apparatus for rotating image data used in a facsimile device, a digital copying machine, or a printer.

2. Description of the Prior Art

In a conventional facsimile device, when it has been loaded with recording paper with a lateral length different from that of an image being read for transmission or received, the image has been recorded at the center of recording paper in the size as is if the recording paper has had larger width. The image has been recorded after it has been reduced in its lateral size if the recording paper has had narrower width.

In addition, if the image has the same longitudinal size as the width of recording paper, for example, if the image size is B5 (182 mm×257 mm), while the width of recording paper is B4 (257 mm), there has been a device which has recorded the image on the recording paper after it is rotated by 90 degrees. This image rotating method has used two page memories each storing image data of one sheet. First, after image data for the first sheet before it has been rotated (original image data) has been written in one page memory, the original image data is rotated by reading from that page memory, and the rotated image data is written into the other page memory. Then, while original image data for second sheet has been being written in one page memory, the rotated image data for the first sheet has been read from the other page memory. However, this method has a disadvantage that it requires two page memories, so that the device becomes expensive.

Then, as an approach to solve this disadvantage, Japanese Patent Application Laid-Open No. 6-105118 discloses an image data rotating method which rotates original image data using a line buffer capable of storing image data of several lines, and writes the rotated image data in one page memory. This image data rotating method is outlined in the following. As shown in FIG. 32, after several lines of original image data is once stored in an n-line buffer memory 31, it is read and rotated in a rotating section 32, and the rotated image data is written in a predetermined address of a page memory 33. After the above process is performed until all image data for one sheet is written in the page memory 33, the rotated image data for one sheet is read from the page memory 33 and recorded on recording paper at a recording section 34.

According to this image data rotating method, since it is sufficient to provide one page memory and several line memories, capacity of memory can be reduced when compared to the above-mentioned image rotating method.

In FIG. 32, since a code storage section and other components are not directly related to the present invention, description of them is omitted. Refer to the published specification for detail.

In addition, Japanese Patent Application Laid-Open No. 7-320053 discloses an image data rotating method described below. This image data rotating method uses one page memory, and two buffer memories which have storage capacity capable of storing image data for n pixels×n lines (n being a positive integer) out of image data stored in the page memory. Then, image data of n pixels×n lines is read from the page memory, and written in one of the buffer memories. After the image data of n pixels×n lines is rotated by using the other buffer memory, the rotated image data of n pixels×n lines is written in the same area in the page memory where the image data of n pixels×n lines before rotation has been stored.

The conventional image data rotating method disclosed in Japanese Patent Application Laid-Open No. 6-105118 or 7-320053 requires the n-line buffer 31 capable of storing image data of several lines or two buffer memories capable of storing image data of n pixels×n lines, both of which are used only for rotation of image data, in addition to the page memory for storing image data for one sheet.

Therefore, there is a disadvantage that provision of the n-line buffer 31 or two buffer memories dedicated for rotation of image data makes the device expensive, and they are wasteful if image data is not frequently rotated.

In addition, since the conventional image data rotating method requires a process for writing image data in the n-line buffer 31 or the buffer memories, a process for rotating the image data, and a process for writing the rotated image data for one sheet in the page memory, in addition to processes when the rotation is not performed such as a process for writing the image data for one sheet in the page memory, and a process for reading the image data for one sheet from the page memory, it has a disadvantage that time in rotating and recording the image data for one sheet is about twice than a case where rotation is not performed.

Furthermore, the conventional image data rotating method has the following disadvantages since, after it once writes image data for one sheet in the page memory, it reads and rotates the image data, and then writes the rotated image data for one sheet in the page memory. That is, if, after image data is rotated, the image data cannot be recorded in the form after the rotation, for example, when original image data of A4 size (210 mm×297 mm) with its longitudinal direction as the vertical direction is rotated by 90 degrees, and recorded on recording paper with width of the longitudinal length of A4 size (297 mm), the recording paper is exhausted, and recording paper with width of the lateral length of A4 size (210 mm, but actual width of recording paper being 216 mm) is loaded on the device, it becomes necessary to perform a process for returning the rotated image data to the image data before rotation, and a process for reading original image data, whereby recording the image data on the recording paper takes much time by such amount.

SUMMARY OF THE INVENTION

The present invention is made in view of the above circumstances, and intended to provide a method and apparatus for rotating image data which can reduce capacity of memory used for rotation of image data, and shorten processing time.

To solve the above problems, an image data rotating method according to a first aspect of the present invention comprises the steps of:

using an image memory capable of storing pixels in same number as square of a maximum number among number of pixels per one line of each of image data with a plurality of sizes to be rotated and number of lines to be rotated;

number of pixels and number of lines in the same number as one of common divisors of the number of pixels per line and the number of lines being unit number of pixels and unit number of lines in the process writing or reading the image data in or from said image memory;

for consecutive two pages in image data with the same size of a plurality of pages to be rotated, reading all pixels of image data in a former page written in the image memory from each storage area at each address of the image memory in a predetermined order of reading according to an angle to be rotated by the unit number of pixels for one line and by the unit number of lines for all lines; and writing all pixels of image data in the latter page in the same storage area at the same address of the image memory in said predetermined order by the unit number of pixels for one line and by the unit number of lines for all lines.

The image data rotating method according to a second aspect of the present invention comprises: a first process comprising the steps of:

using an image memory capable of storing pixels in same number as square of a maximum number among number of pixels per one line of each of image data with a plurality of sizes to be rotated and number of lines to be rotated;

number of pixels and number of lines in the same number as one of common divisors of the number of pixels per line and the number of lines being unit number of pixels and unit number of lines in the process writing or reading the image memory; and for image data with the same size of a plurality of pages to be rotated, sequentially writing all pixels of image data of the first page in the image memory from the first storage area at the first address to an address and storage area corresponding to the size by the unit number of pixels for one line and by the unit number of lines for all lines; or writing in each storage area at each address of the image memory in a predetermined order of writing according to an angle to be rotated by the unit number;

a second process comprising the steps of: for image data of consecutive two pages, reading all pixels of image data in a former page written in the image memory from each storage area at each address of the image memory in a predetermined order of reading according to the same angle as the above angle or at a different angle to be rotated by the unit number of pixels for one line and by the unit number of lines for all lines; and writing all pixels of image data in the latter page in the same storage area at the same address of the image memory in said predetermined order by the unit number of pixels for one line and by the unit number of lines for all lines.

The image data rotating method according to a third aspect of the present invention comprises: a first process comprising the steps of:

using an image memory capable of storing pixels in the same number as the squared maximum number of the number of pixels per line of each of image data with a plurality of sizes to be rotated $m_1, m_2, m_3, \ldots$ (m being a positive integer, the subscript indicating that size is different) and the number of lines $n_1, n_2, n_3, \ldots$ (n being a positive integer, the subscript indicating that size is different and corresponds to $m_1, m_2, m_3, \ldots$);

k pixels and k lines in the same number as one of common divisors k of the number of pixels per line $m_1, m_2, m_3, \ldots$ and the number of lines $n_1, n_2, n_3, \ldots$ (k being a positive integer) being unit number of pixels and unit number of lines in the process writing or reading the image memory;

for image data of a plurality of pages with the same size to be rotated by 90 degrees, selecting k pixels out of $k^2$ pixels, which are read by specifying by n/k all pixels in image data of the 4j-th (j=0, 1, 2, ... ) page stored in the image memory from the first address of addresses of the image memory, from storage areas (i−1+L×k) in the address (i being a variable indicating the order of pixels to be read, i=1, 2, ... , k, L being a variable indicating the order of lines in a line group consisting of k lines which constitute the rotated image data, L=1, 2, ... , k); and writing all pixels of image data at (4j+1)-th page to be rotated every k pixels in the specified storage area at the same address of the image memory in which the selected k pixels are stored;

the writing step being repeated until the value of L exceeds k by updating the address by one every time the processes for reading and writing k pixels are completed, and returning the address to the first address every time the process is completed for one line;

a second process comprising the steps of: selecting k pixels out of $k^2$ pixels, which are read by specifying by one all pixels in image data of the (4j+1)-th page stored in the image memory from the (n/k−1)-th address of addresses of the image memory to the first address, from storage areas (i×k−L−1) in the address; and writing all pixels of image data at (4j+2)-th page to be rotated every k pixels in k storage areas at the same address of the specified image memory;

the writing step being repeated until the value of L exceeds k by updating by n/k the address every time the processes for reading and writing k pixels are completed, and returning the address to the first address every time the process is completed for one line;

a third process comprising the steps of: selecting k pixels out of $k^2$ pixels, which are read by specifying by n/k all pixels in image data of the (4j+2)-th page stored in the image memory from the $(n^2/k^2-1)$-th address of addresses of the image memory to the first address, from storage areas {(k−L)×k−i} in the address; and writing all pixels of image data at (4j+3)-th page to be rotated every k pixels in k storage areas at the same address of the specified image memory;

the writing step being repeated until the value of L exceeds k by reducing the address by one every time the processes for reading and writing k pixels are completed, and returning the address to the first address every time the process is completed for one line; and a fourth process comprising the steps of: selecting k pixels out of $k^2$ pixels, which are read by specifying by one all pixels in image data of the (4j+3)-th page stored in the image memory from the $\{n \times (n-k)/k^2\}$-th address of addresses of the image memory to the first address, from storage areas {(k−i)×k+L} in the address; and writing all pixels of image data at (4j+4)-th page to be rotated every k pixels in k storage areas at the same address of the specified image memory;

the writing step being repeated until the value of L exceeds k by reducing by n/k the address every time the processes for reading and writing k pixels are completed, and returning the address to the first address every time the process is completed for one line;

wherein the fourth process is followed by the first process, the read image data is not output in the first process if j=0.

The image data rotating method according to a fourth aspect of the present invention comprises: a first process comprising the steps of:

using an image memory capable of storing pixels in the same number as the squared maximum number of the number of pixels per line of each of image data with a plurality of sizes to be rotated $m_1, m_2, m_3, \ldots$ (m being a positive integer, the subscript indicating that size is different) and the number of lines $n_1, n_2, n_3, \ldots$ (n being a positive integer, the subscript indicating that size is different and corresponds to $m_1, m_2, m_3, \ldots$);

k pixels and k lines in the same number as one of common divisors k of the number of pixels per line $m_1, m_2, m_3, \ldots$ and the number of lines $n_1, n_2, n_3, \ldots$ (k being a positive integer) being unit number of pixels and unit number of lines in the process writing or reading the image memory;

for image data of a plurality of pages with the same size to be rotated by 180 degrees, selecting k pixels out of $k^2$ pixels, which are read by specifying by n/k all pixels in image data of the 2j-th (j=0, 1, 2, ...) page stored in the image memory from the first address of addresses of the image memory, from storage areas (i−1+L×k) in the address (i being a variable indicating the order of pixels to be read, i=1, 2, ..., k, L being a variable indicating the order of lines in a line group consisting of k lines which constitute the rotated image data, L=1, 2, ..., k); and writing all pixels of image data at (2j+1)-th page to be rotated every k pixels in storage areas at the same address of the specified image memory in which the selected k pixels are stored; and the writing step being repeated until the value of L exceeds k by updating the address by one every time the processes for reading and writing k pixels are completed, and returning the address to the first address every time the process is completed for one line;

a second process comprising the steps of: selecting k pixels out of $k^2$ pixels, which are read by specifying by n/k all pixels in image data of the (2j+1)-th page stored in the image memory from the $(n^2/k^2-1)$-th address of addresses of the image memory to the first address, from storage areas $\{(k-L)\times k-i\}$ in the address; and writing all pixels of image data at (2j+2)-th page to be rotated every k pixels in k storage areas at the same address of the specified image memory;

the writing step being repeated until the value of L exceeds k by reducing the address by one every time the processes for reading and writing k pixels are completed, and returning the address to the first address every time the process is completed for one line; and wherein the second process is followed by the first process, the read image data being not output in the first process if j=0.

The image data rotating method according to a fifth aspect of the present invention comprises: a first process comprising the steps of:

using an image memory capable of storing pixels in the same number as the squared maximum number of the number of pixels per line of each of image data with a plurality of sizes to be rotated $m_1, m_2, m_3, \ldots$ (m being a positive integer, the subscript indicating that size is different) and the number of lines $n_1, n_2, n_3, \ldots$ (n being a positive integer, the subscript indicating that size is different and corresponds $m_1, m_2, m_3, \ldots$);

k pixels and k lines in the same number as one of common divisors k of the number of pixels per line $m_1, m_2, m_3, \ldots$ and the number of lines $n_1, n_2, n_3, \ldots$ (k being a positive integer) being unit number of pixels and unit number of lines in the processes writing and reading the image memory;

for image data of a plurality of pages with the same size to be rotated by 270 degrees, selecting k pixels out of $k^2$ pixels, which are read by specifying all pixels in image data of the 4j-th (j=0, 1, 2, ...) page stored in the image memory by every n/k from the first address of addresses of the image memory, from storage areas (i−1+L×k) in the address (i being a variable indicating the order of pixels to be read, i=1, 2, ..., k, L being a variable indicating the order of lines in a line group consisting of k lines which constitute the rotated image data, L=1, 2, ..., k); and writing all pixels of image data at (4j+1)-th page to be rotated every k pixels in storage area at the same address of the specified image memory in which the selected k pixels are stored;

the writing step being repeated until the value of L exceeds k by updating the address by one every time the processes for reading and writing k pixels are completed, and returning the address to the first address every time the process is completed for one line;

a second process comprising the steps of: selecting k pixels out of $k^2$ pixels, which are read by specifying by one all pixels in image data of the (4j+1)-th page stored in the image memory from the $\{n\times(n-k)/k^2\}$-th address of addresses of the image memory to the first address, from storage areas $\{(k-i)\times k+L\}$ in the address; and writing all pixels of image data at (4j+2)-th page to be rotated every k pixels in k storage areas at the same address of the specified image memory;

the writing step being repeated until the value of L exceeds k by reducing by n/k the address every time the processes for reading and writing k pixels are completed, and returning the address to the first address every time the process is completed for one line;

a third process comprising the steps of: selecting k pixels out of $k^2$ pixels, which are read by specifying by n/k all pixels in image data of the (4j+2)-th page stored in the image memory from the $(n^2/k^2-1)$-th address of addresses of the image memory to the first address, from storage areas $\{(k-L)\times k-i\}$ in the address; and writing all pixels of image data at (4j+3)-th page to be rotated every k pixels in k storage areas at the same address of the specified image memory;

the writing step being repeated until the value of L exceeds k by reducing the address by one every time the processes for reading and writing k pixels are completed, and returning the address to the first address every time the process is completed for one line; and a fourth process comprising the steps of: selecting k pixels out of $k^2$ pixels, which are read by specifying by one all pixels in image data of the (4j+3)-th page stored in the image memory from the (n/k−1)-th address of addresses of the image memory to the first address, from storage areas (i×k−L−1) in the address; and writing all pixels of image data at (4j+4)-th page to be rotated every k pixels in k storage areas at the same address of the specified image memory;

the writing step being repeated until the value of L exceeds k by updating by n/k the address every time the processes for reading and writing k pixels are completed, and returning the address to the first address every time the process is completed for one line;

wherein the fourth process is followed by the first process, the read image data is not output in the first process if j=0.

The image data rotating method according to a sixth aspect of the present invention comprises: a first process comprising the steps of:

using an image memory capable of storing pixels in the same number as the squared maximum number of the number of pixels per line of each of image data with a plurality of sizes to be rotated $m_1, m_2, m_3, \ldots$ (m being a positive integer, the subscript indicating that size is different) and the number of lines $n_1, n_2, n_3, \ldots$ (n being a positive integer, the subscript indicating that size is different and corresponds to $m_i, m_2, m_3, \ldots$);

k pixels and k lines in the same number as one of common divisors k of the number of pixels per line $m_1, m_2, m_3, \ldots$ and the number of lines $n_1, n_2, n_3, \ldots$ (k being a positive integer) being unit number of pixels and unit number of lines in the process writing or reading the image memory;

for image data of a plurality of pages with the same size to be rotated, selecting k pixels out of $k^2$ pixels, which are read by specifying by n/k all pixels in image data of the 4j-th (j=0, 1, 2, . . . ) page stored in the image memory from the first address of addresses of the image memory, from storage areas (i−1+L×k) in the address (i being a variable indicating the order of pixels to be read, i=1, 2, . . . , k, L being a variable indicating the order of lines in a line group consisting of k lines which constitute the rotated image data, L=1, 2, . . . , k); and writing all pixels of image data at (4j+1)-th page to be rotated every k pixels in storage areas at the same address of the specified image memory in which the selected k pixels are stored;

the writing step being repeated until the value of L exceeds k by updating the address by one every time the processes for reading and writing k pixels are completed, and returning the address to the first address every time the process is completed for one line;

a second process comprising the steps of: selecting k pixels out of $k^2$ pixels, which are read by specifying by one all pixels in image data of the (4j+1)-th page stored in the image memory from the (n/k−1)-th address of addresses of the image memory to the first address, from storage areas (i×k−L−1) in the address; and writing all pixels of image data at (4j+2)-th page to be rotated every k pixels in k storage areas at the same address of the specified image memory;

the writing step being repeated until the value of L exceeds k by updating by n/k the address every time the processes for reading and writing k pixels are completed, and returning the address to the first address every time the process is completed for one line;

a third process comprising the steps of: selecting k pixels out of $k^2$ pixels, which are read by specifying by n/k all pixels in image data of the (4j+2)-th page stored in the image memory from the $(n^2/k^2-1)$-th address of addresses of the image memory to the first address, from storage areas {(k−L)×k−i} in the address; and writing all pixels of image data at (4j+3)-th page to be rotated every k pixels in k storage areas at the same address of the specified image memory;

the writing step being repeated until the value of L exceeds k by reducing the address by one every time the processes for reading and writing k pixels are completed, and returning the address to the first address every time the process is completed for one line; and a fourth process comprising the steps of: selecting k pixels out of $k^2$ pixels, which are read by specifying by one all pixels in image data of the (4j+3)-th page stored in the image memory from the $\{n \times (n-k)/k^2\}$-th address of addresses of the image memory to the first address, from storage areas {(k−i)×k+L} in the address; and writing all pixels of image data at (4j+4)-th page to be rotated every k pixels in k storage areas at the same address of the specified image memory;

the writing step being repeated until the value of L exceeds k by reducing by n/k the address every time the processes for reading and writing k pixels are completed, and returning the address to the first address every time the process is completed for one line;

wherein, when the image data is rotated by 90 degrees, the first to the fourth processes are sequentially performed;

the fourth process being followed by the first process;

the read image data being not output in the first process if j=0;

when the image data is rotated by 180 degrees, the first and the third processes being alternately performed;

the read image data being not output in the first process if j=0;

when the image data is rotated by 270 degrees, said first, the fourth, the third, and the second processes being performed in this order;

the second process being followed by the first process;

the read image data being not output in the first process if j=0;

when image data being repeatedly not rotated and rotated by 180 degrees every other page, the first, the first, the third and the third processes being performed in this order;

the third process of the second time being followed by the first process of the first time;

the read image data being not output in the first process if j=0;

when image data being repeatedly rotated by 90 and 270 degrees every other page, the first, and the second processes being alternately performed;

the read image data being not output in the first process if j=0;

when image data being repeatedly rotated by 270 and 90 degrees every other page, the first, and the fourth processes being alternately performed;

the read image data being not output in the first process if j=0.

A seventh aspect of the present invention relates to the image data rotating method according to any one of the first to sixth aspects, wherein, before the pixels are written, image synthesization is performed for pixels read from the same storage area at the same address of the image memory and pixels to be written, the synthesized image being written in the same storage area at the same address of the image memory.

An eighth aspect of the present invention relates to the image data rotating method according to any one of the first to seventh aspects, wherein, after image data of a page is written in the image memory in a predetermined procedure, if the image data cannot be read and output outside in a procedure different from the predetermined procedure, but can be output outside in the predetermined procedure, if it is read in the predetermined procedure.

The image data rotating apparatus according to a ninth aspect of the present invention comprises:

operation controller means having an image capable of the squared maximum number of the number of pixels per line of each of image data with a plurality of sizes to be rotated $m_1$, $m_2$, $m_3$, . . . (m being a positive integer, the subscript indicating that size is different) and the number of line s $n_1$, $n_2$, $n_3$, . . . (n being a positive integer, the subscript indicating that size is different, and corresponds to $m_1$, $m_2$, $m_3$, . . . , respectively), k pixels and k lines in the same number as one of common divisors k of the number of pixels per line $m_1$, $m_2$, $m_3$, . . . and the number of lines $n_1$, $n_2$, $n_3$, . . . being unit number of pixel and unit number of line in the process writing or reading the image data, and generating information on size of image data to be rotated and an angle to be rotated;

a page counter for counting the number of paged for specifying which ordered page of the image data of a plurality of pages to be rotated is processed;

a line counter for counting the number of lines from 0 to (k−1) for specifying pixels on which ordered line in the line group consisting of k lines should be processed in image data of one page to be rotated;

address controller means for generating address data of the image memory from or to which pixels should be read or written based on information, the number of pages, and the number of lines supplied from the operation controller means, the page counter and the line counter; and area selection controller means for selecting k storage areas which store k pixels out of a plurality of pixels constituting image data of the former page read from an address specified by the address data of the image memory based on the information, the number of pages and the number of lines supplied from the operation controller means, the page counter and the line counter, for extracting k pixels corresponding to the areas, and for writing k pixels constituting image data to be rotated in the selected storage areas;

having a control procedure, the control procedure consisting of a first process comprising the steps of: for image data of a plurality of pages with the same size to be rotated by 180 degrees, selecting k pixels out of $k^2$ pixels, which are read by specifying by n/k all pixels in image data of the 4j-th (j=0, 1, 2, . . . ) page stored in the image memory by every n/k from the first address of addresses of the image memory, from storage areas (i−1+L×k) in the address (i being a variable indicating the order of pixels to be read, i=1, 2, . . . , k, L being a variables indicating the order of lines in a line group consisting of k lines, L=1, 2, . . . , k); and writing all pixels of image data at (4j+1)-th page to be rotated every k pixels in k storage areas at the same address of the specified image memory;

the writing step being repeated until the value of L exceeds k by updating the address by one every time the processes for reading and writing k pixels complete, and returning the address to the first address every time the process completes for one line;

a second process comprising the steps of: selecting k pixels out of $k^2$ pixels, which are read by specifying by one all pixels in image data of the (4j+1)-th page stored in the image memory from the (n/k−1)-th address of addresses of the image memory to the first address, from storage areas (i×k−L−1) in the address; and writing all pixels of image data at (4j+2)-th page to be rotated every k pixels in k storage areas at the same address of the specified image memory;

the writing step being repeated until the value of L exceeds k by updating by n/k the address by one every time the processes for reading and writing k pixels complete, and returning the address to the first address every time the process completes for one line;

a third process comprising the steps of: selecting k pixels out of $k^2$ pixels, which are read by specifying by n/k all pixels in image data of the (4j+2)-th page stored in the image memory from the $(n^2/k^2-1)$-th address of addresses of the image memory to the first address, from storage areas {(k−L)×k−i} in the address; and writing all pixels of image data at (4j+3)-th page to be rotated every k pixels in k storage areas at the same address of the specified image memory;

the writing step being repeated until the value of L exceeds k by updating by one the address by one every time the processes for reading and writing k pixels complete, and returning the address to the first address every time the process completes for one line; and a fourth process comprising the steps of: selecting k pixels out of $k^2$ pixels, which are read by specifying by one all pixels in image data of the (4j+3)-th page stored in the image memory from the $\{n\times(n-k)/k^2\}$-th address of addresses of the image memory to the first address, from storage areas {(k−i)×k+L} in the address; and writing all pixels of image data at (4j+4)-th page to be rotated every k pixels in k storage areas at the same address of the specified image memory;

the writing step being repeated until the value of L exceeds k by reducing by n/k the address by one every time the processes for reading and writing k pixels complete, and returning the address to the first address every time the process completes for one line;

wherein, when the image data is rotated by 90 degrees, the first to the fourth processes are sequentially performed; the fourth process being followed by the first process; the read image data being not output in the first process if j=0;

when the image data is rotated by 180 degrees, the first and the third processes being alternately performed;

the read image data being not output in the first process if j=0;

when the image data is rotated by 270 degrees, first, the fourth, the third, and the second processes being performed in this order;

the second process being followed by the first process;

the read image data being not output in the first process if j=0;

when image data being repeatedly not rotated and rotated by 180 degrees every one other page, the first, the first, the third and the third processes being performed in this order;

the third process of the second time being followed by the first process of the first time;

the read image data being not output in the first process if j=0;

when image data being repeatedly rotated by 90 and 270 degrees every one other page, the first, and the second processes being alternately performed;

the read image data being not output in the first process if j=0;

when image data being repeatedly rotated by 270 and 90 degrees every one other page, the first, and the fourth processes being alternately performed;

the read image data being not output in the first process if j=0.

A tenth aspect of the present invention relates to the image data rotating apparatus according to the ninth aspect, wherein the area selection controller means performs image synthesization for pixels read from the same storage area at the same address of the image memory and pixels to be written, and writes the synthesized pixels in the same storage area at the same address of the image memory.

An eleventh aspect of the present invention relates to the image data rotating apparatus according to the ninth or tenth aspect, further comprising memory managing means for securing minimum memory capacity necessary for the image data when rotating the image data out of the entire memory capacity of the image memory.

According to the arrangement of the present invention, since it is arranged, in reading rotated image data of a page, to write image data of the next page in the same area at the same address of the image memory, it is possible to reduce the amount of memory used for rotating the image data, and to shorten the processing time.

In addition, rotation for image data of the second page and thereafter can be performed at a speed similar to the case where the image data is simply once written and read in and from the image memory without the rotation.

BRIEF DESCRIPTION OF THE DRAWINGS

This above-mentioned and other objects, features and advantages of this invention will become more apparent by reference to the following detailed description of the invention taken in conjunction with the accompanying drawings, wherein:

FIG. 12 is a conceptional diagram showing specific changes of a state storing pixels in an image memory when the original image data is rotated by 90 degrees;

FIG. 14 is a conceptional diagram showing specific changes of a state storing pixels in an image memory when the original image data is rotated by 90 degrees;

FIG. 16 is a conceptional diagram showing specific changes of a state storing pixels in an image memory when the original image data is rotated by 90 degrees;

FIG. 18 is a conceptional diagram showing specific changes of a state storing pixels in an image memory when the original image data is rotated by 90 degrees;

FIG. 19 is a conceptional diagram showing changes of a state storing pixels in an image memory when the original image data is rotated by 180 degrees;

FIG. 20 is a conceptional diagram showing specific changes of a state storing pixels in an image memory when the original image data is rotated by 180 degrees;

FIG. 21 is a conceptional diagram showing specific changes of a state storing pixels in an image memory when the original image data is rotated by 270 degrees;

FIG. 22 is a conceptional diagram showing specific changes of a state storing pixels in an image memory when the original image data is rotated by 270 degrees;

FIG. 23 is a conceptional diagram showing specific changes of a state storing pixels in an image memory when the original image data is rotated by 270 degrees;

FIG. 24 is a conceptional diagram showing changes of a state storing pixels in an image memory when the original image data is rotated by 270 degrees;

FIG. 29 is a control procedure showing a combination of procedures when image data is repeatedly not rotated and rotated by 180 degrees every one other page in the fourth embodiment of the present invention;

FIG. 30 is a control procedure showing a combination of procedures when image data is repeatedly rotated and rotated by 90 degrees and 270 degrees every one other page in the fourth embodiment of the present invention;

DETAILED DESCRIPTION OF THE PREFERRED EMBODIMENTS

Now, embodiments of the present invention is described with reference to the drawings. The description is specifically made on the embodiments.

A. First Embodiment

Figure 1:
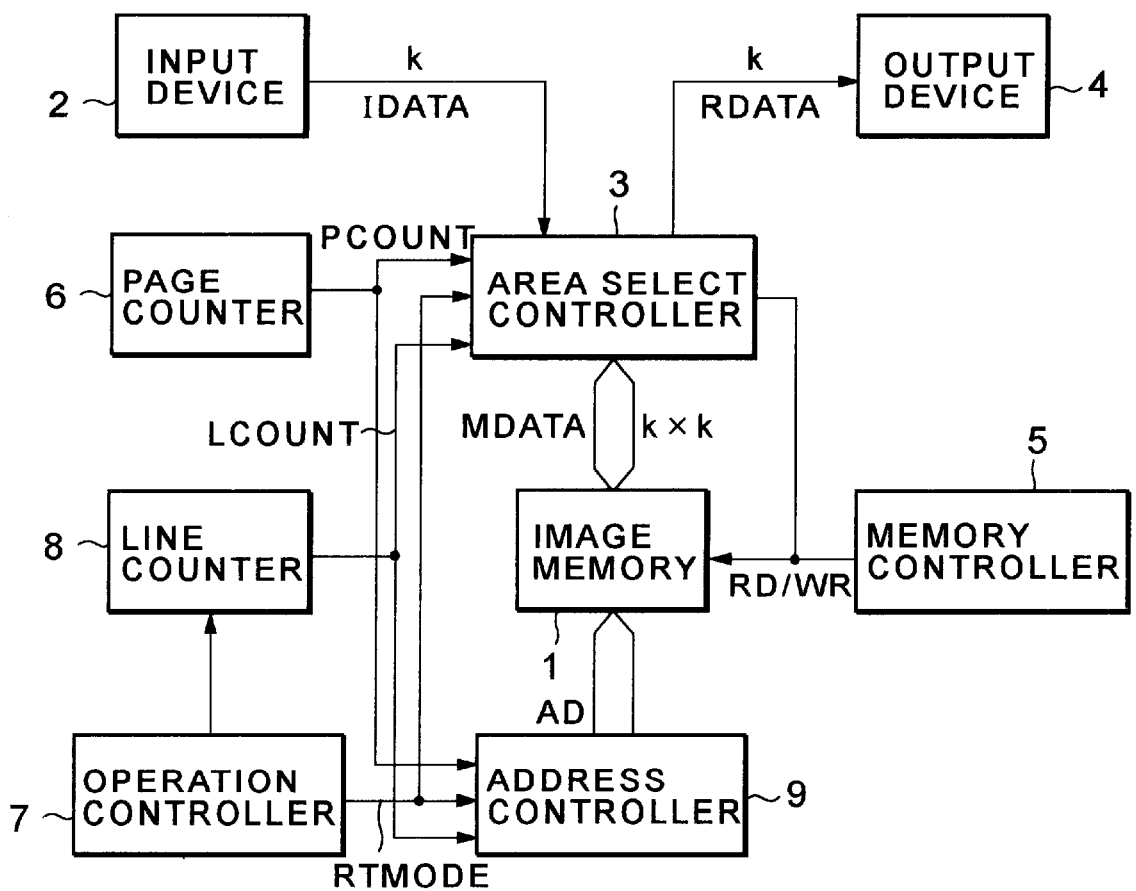
FIG. 1 is a block diagram showing an electrical arrangement of an image data rotating apparatus which is a first embodiment of the present invention.

FIG. 1 is a block diagram showing an electrical arrangement of an image data rotating apparatus which is a first embodiment of the present invention.

The image data rotating apparatus of the embodiment substantially comprises an image memory 1, input device 2, area selection controller 3, output device 4, memory controller 5, a page counter 6, operation controller 7, a line counter 8, and address controller 9.

Figure 2:
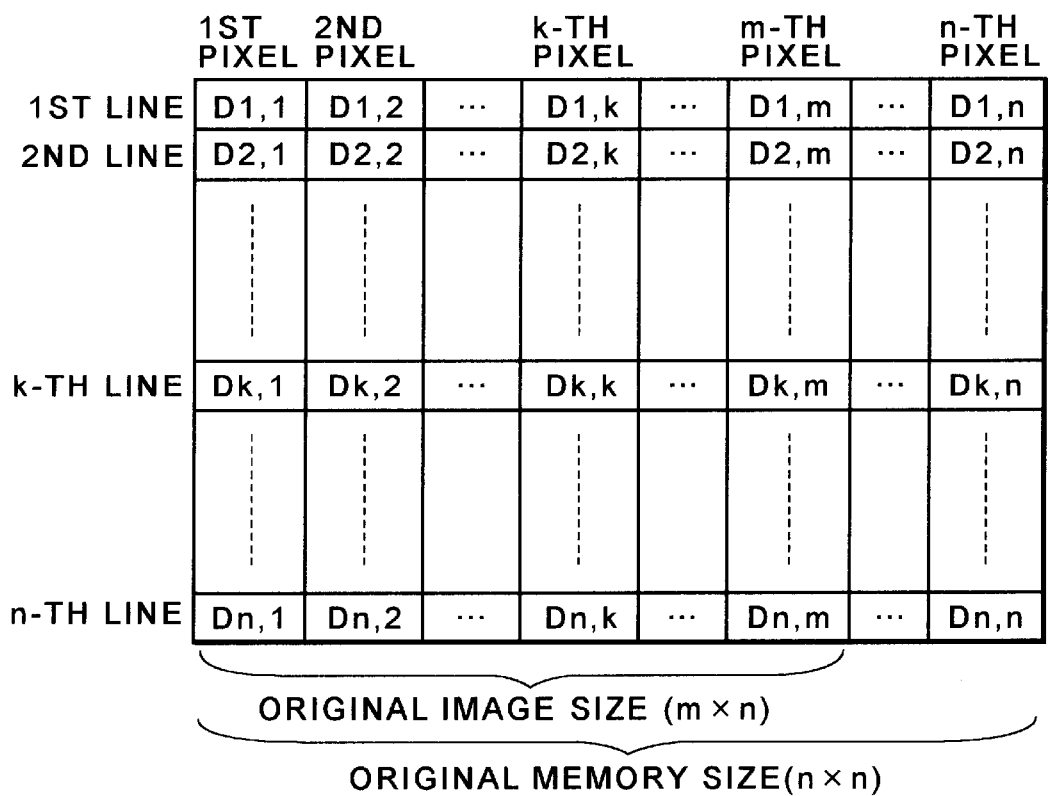
FIG. 2 is a conceptional diagram showing a configuration of original image data and image memory.

FIG. 2 shown a configuration of original image data and the image memory 1. Size of the original image data is assumed to be m pixel in the lateral direction, and n lines in the longitudinal direction. That is, for example, when an original is transmitted, the original image data to be rotated is read as m pixels by scanning the original to be transmitted from the left end to the right end of FIG. 2 with an image reading mechanism (not shown) (main scanning direction), and as n lines by scanning the original from the top end to the bottom end (sub-scanning direction). Here, m and n are multiples of k which represents the number of pixels being written or read in one process in writing or reading the original image data in or from the image memory 1. In other words, k is a common devisor of m and n. In the embodiment, k=4. In addition, both the values of m and n are (k×k) or more, with a relationship of n (m.

Figures 3, 4:
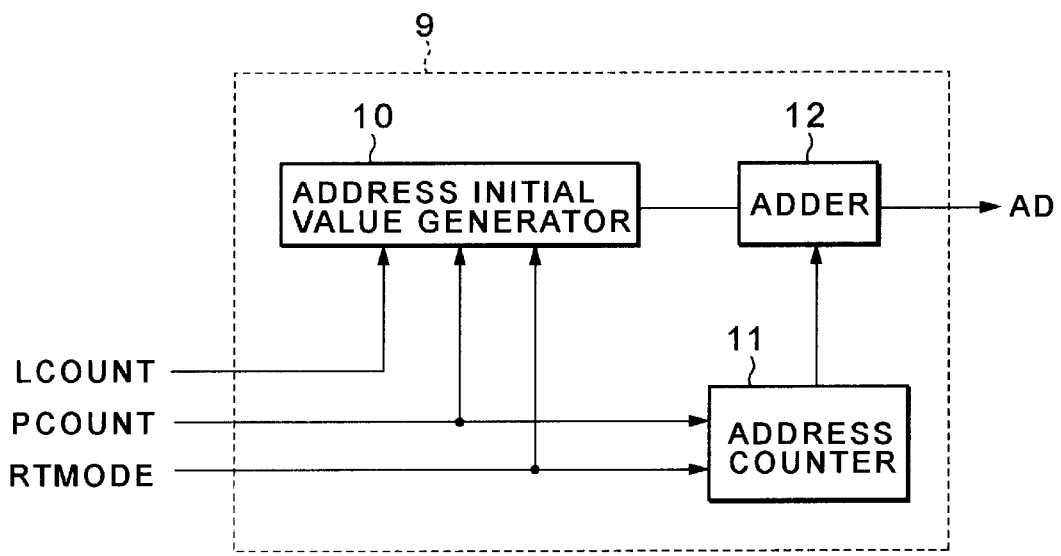
FIG. 3 is a conceptional diagram showing a configuration of original image data with 16 pixels and 16 lines.
FIG. 4 is a block diagram showing an electrical arrangement of address controller means.

The first pixel on the first line of the original data is represented by a pixel D1, 1 at the left end in the top row in FIG. 2, the second to m-th pixels on the first line being sequentially represented by pixels D1, 2–D1, m toward the right end. Same is true for the second to n-th lines. FIG. 3 shows a configuration of original image data when m=n=16, or with 16 pixels by 16 lines. In the figure, the first pixel on the first line is represented by (00) using the hexadecimal notation, the 16-th pixel on the first line by (0F). Similarly, each pixel on the second to 16-th lines is represented by (10)–(1F), . . . (F0)–(FF).

In addition, the image memory 1 has a size of (n×n) pixels. Then, the image memory 1 is arranged to store up to m-th on each line of pixel image data of the first page at stating rotation of the image in correspondence to the reading direction of the original image data in areas corresponding to each pixel as shown in FIG. 2. In addition, the image memory 1 is added areas of (m+1)-th to n-th in correspondence to each line of the original image data of the first for storing image data of the second page and thereafter. Here, FIG. 2 is a conceptional diagram only to describe correspondence between the configuration of the original image data and the image memory 1, and differs from an actual storage location of each pixel in the image memory 1. Moreover, the procedures for writing and reading the image data will be explained later.

Now, there is again described the arrangement of the image data rotating apparatus shown in FIG. 1. Referring to FIG. 1, the original image data to be rotated is input as input image data IDATA by k pixels through the input device 2, and each pixel is stored in an area of the image memory 1 selected by the area selection controller 3. Then, the rotated image data is read one pixel after another from the selected area of the image data 1 by the area selection controller 3, and output as output image data RDATA by k pixel through the output device 4.

The memory controller 5 generates timing data RD for reading the image data from the image memory 1 and timing data WR for writing the image data in the image memory 1, and supplies them to the image memory 1 and the area selection controller 3. This causes the image data MDATA consisting of (k×k) pixels to be read from an area at an address specified by address data AD supplied from the address controller 9 at the timing of timing data RD, and the image data MDATA consisting of (k×k) pixels to be written in an area at a specified address at the timing of timing data WR.

The page counter 6 counts the number of pages for specifying on which ordered page the image data should be rotated. In this embodiment, since rotation is performed in a unit of four pages, the page counter 6 repeatedly counts from 0 (first page) to 3 (fourth page), and supplies the count value as the page count value PCOUNT to the area selection controller 3 and the adders controller 9.

The operation controller 7 supplies rotation mode data RTMODE which is information on the size of original image data, and an angle (90, 180, 270 degrees) by which the original image data should be rotated to the area selection controller 3 and the address controller 9, and supplies to the line counter 8 a line information which is a command for starting counting-up of the line counter 8.

The line counter 8 repeatedly counts the number of lines from 0 to (k−1) specifying on which ordered line in a specified line group consisting of k line pixels shout be processed in the image data of one page to be rotated based on the line information supplied from the operation controller 7. Then, the line counter 8 supplies its count value as a line count value LCOUNT to the area selection controller 3 and the address controller 9.

The address controller 9 selects a predetermined control procedure previously set for the size of original image data and an angle for rotating the original image data based on various information such as the rotation mode data RTMODE, and count values PCOUNT and LCOUNT supplied from the operation controller 7, the page counter 6 and the line counter 8, generates an address initial value of the image memory 1 from or to which pixels shout be read or written according to the control procedure, and supplies the address data AD to the image memory 1 while updating the address data AD based on the address initial value.

FIG. 4 is a block diagram showing an electrical arrangement of address controller 9. The address controller 9 substantially comprises an address initial value generator 10, an address counter 11, and an adder 12.

The address initial value generator 10 generates an address initial value according to the selected predetermined control procedure based on the rotation mode data RTMODE, the page count value PCOUNT and the line count value LCOUNT. Since the address initial value is updated every k lines (in this case, four lines), it is updated at a timing when the line count value LCOUNT changes from (k−1) (in this case, 3) to 0.

The address counter 11 counts up or down its count value after completion of write or read of the image data MDATA according to the selected predetermined control procedure based on the rotation mode data RTMODE and the page count value PCOUNT. For example, when the original image data is rotated by 90 degrees, and the image data MDATA of the first page is written, the address counter 11 counts up its count value by one after completion of write or read of the image data MDATA. For example, when the original image data is rotated by 90 degrees, the image data MDATA of the third page is read, and the image data of the fourth page is written, the address counter 11 counts down its count value by one after completion of write or read of the image data MDATA.

The adder 12 adds the address initial value supplied from the address initial value generator 10 and the count value supplied from the address counter 11, and outputs the result as address data AD.

Then, the area selection controller 3 shown in FIG. 1 selects k areas to extract k pixels for constituting output image data RDATA out of $k^2$ pixels which are read from an area at an address of the image memory 1 specified by the address data AD supplied from the address controller 9 based on the rotation mode data RTMODE, the page count value PCOUNT and the line count value LCOUNT supplied from the operation controller 7, the page counter 6 and the line counter 8, supplies the k pixels as output image data RDATA to the output mean of, and then write input image data IDATA consisting of k pixels supplied from the input device 2 in the same area at the selected same address.

Figure 5:
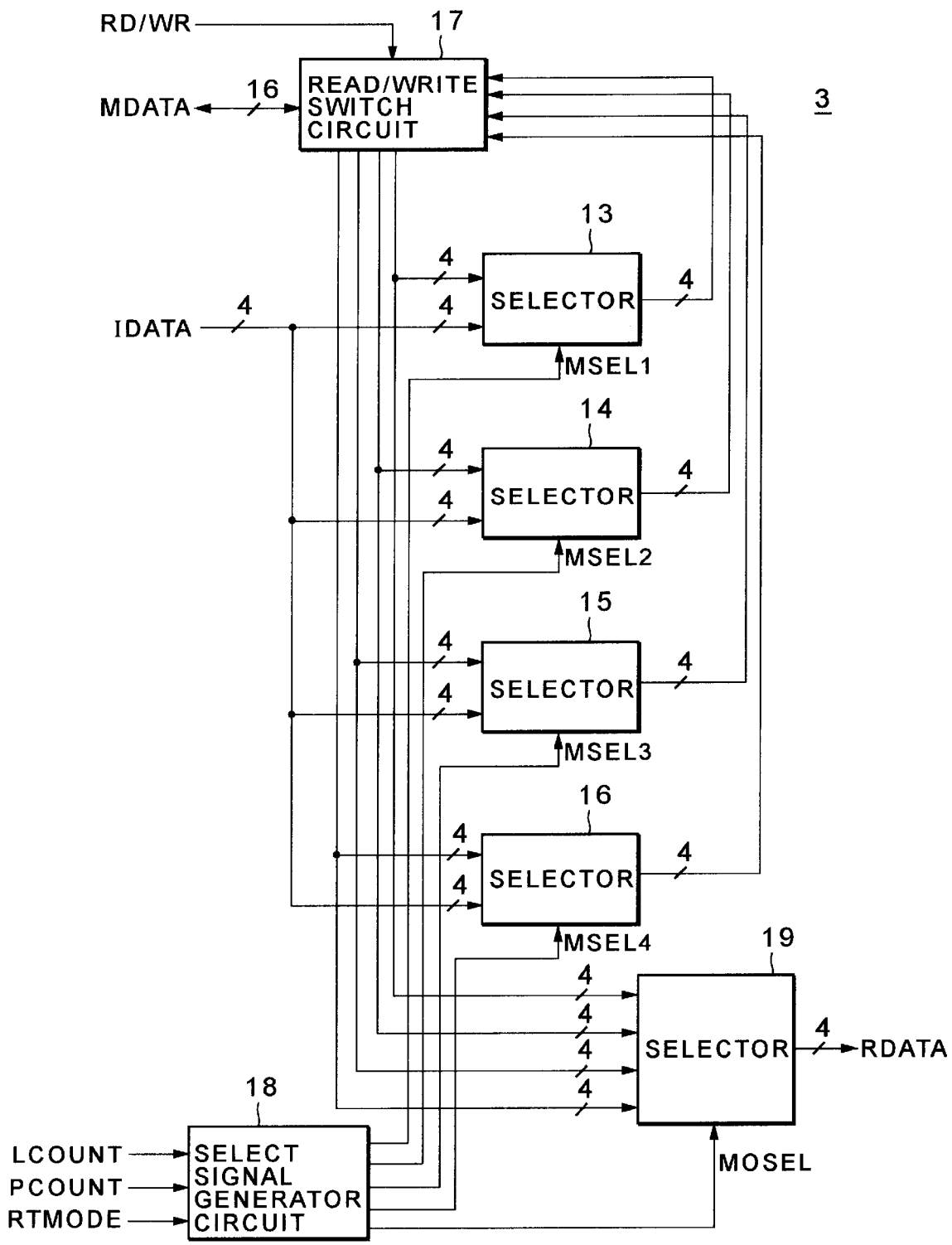
FIG. 5 is a block diagram showing an electrical arrangement of area selection controller means with k=4.

FIG. 5 is a block diagram showing an electrical arrangement of area selection controller 3 with k=4. The input image data IDATA consisting of four pixels supplied from the input device 2 is input to selectors 13–16 through respective one input terminal. In addition, the image data MDATA consisting of 16 (4×4) pixels read from the image memory 1 is divided into four pixels of the first to fourth pixels, the fifth to eighth pixels, and the ninth to twelfth pixels by a read/write switch circuit 7, and then input into the selectors 13–16 through respective another input terminal.

Then, image data consisting of four pixels output from an output terminal of each of the selectors 13–16 is constituted into image data MDATA consisting of 16 pixels by a read/write switch circuit 17, which is then supplied to the image memory 1.

The read/write switch circuit 17 switches supply of image data read from the image memory 1 to the selectors 13–16 and supply of image data output from the selectors 13–16 to the image memory 1 based on the timing data RD and WR supplied from the memory controller 5.

A select signal generator circuit 18 generates select signals MSEL1–MSEL4 and a select signal MOSEL to be supplied to each of the selectors 13–16 based on the rotation mode data RTMODE, the page count value PCOUNT and the line count value LCOUNT supplied from the operation controller 7, the page counter 6 and the line counter 8. The selector 13 selects four pixels constituting the input image data IDATA, and four pixels from the first to fourth pixels of image data MDATA, and supplies to the read/write switch circuit 17. Other selectors 14–16 perform similar operation based on each select signals MSEL2–MSEL4.

This causes the pixels of the input image data IDATA consisting four pixels selected by the select signals MSEL1–MSEL4 to be the pixels to be newly written, which constitutes new image data MDATA together with the pixels read from the image memory 1 corresponding to the unselected pixels, and is written in the image memory 1.

The selector 19 selects four pixels to be output from the image data MDATA consisting of 16 pixels read from the image memory 1 based on the select signal MOSEL supplied from the select signal generator circuit 18, and outputs as the rotated output image data RDATA.

Now, there is described the operation of the image data rotating apparatus with the above arrangement.

First, referring to the conceptional diagrams shown in FIGS. 6–10, there is described change of storage state of pixels to be written or read in or from the image memory 1 when the original image data is rotated by 90 degrees.

As described above, since, while the size of original image data is (m×n), the size of image memory 1 is (n×n) and n≧m, there is no pixel in a location from the (m+1)-th through n-th pixels on each line in the original image data. Therefore, when the original image data of the first page at the start of image rotation is once stored in the image memory 1, and then read as the image data of first page after rotation, there may still remain image data stored when the original image data is previously rotated in areas in the image memory 1 corresponding to the (m+1)-th to n-th pixels, and, in such case, an unnecessary image is recorded on a recording paper when data is read from these areas and recorded.

Then, it is necessary to previously delete the content of storage in the image memory 1 when the rotation of image is started, or to arrange that the pixels read from the areas is not recorded on the recording paper. This embodiment employs the latter approach, and inhibits the output device 4 to output lines constituted by read pixels.

Figure 6:
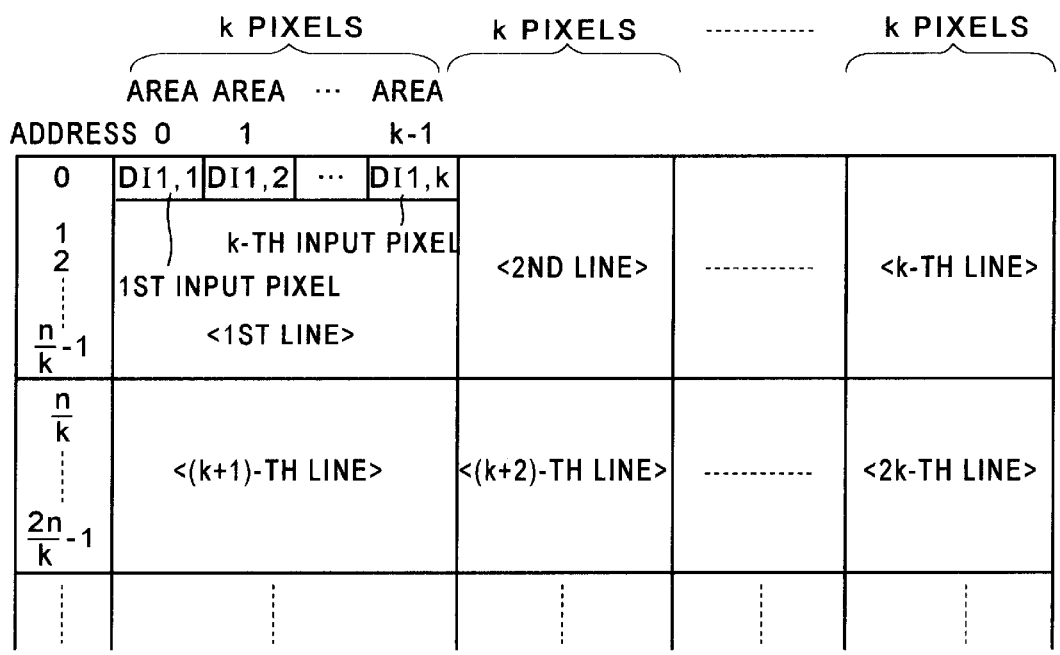
FIG. 6 is a conceptional diagram showing changes of a state storing pixels in an image memory when the original image data is rotated.
Figure 7:
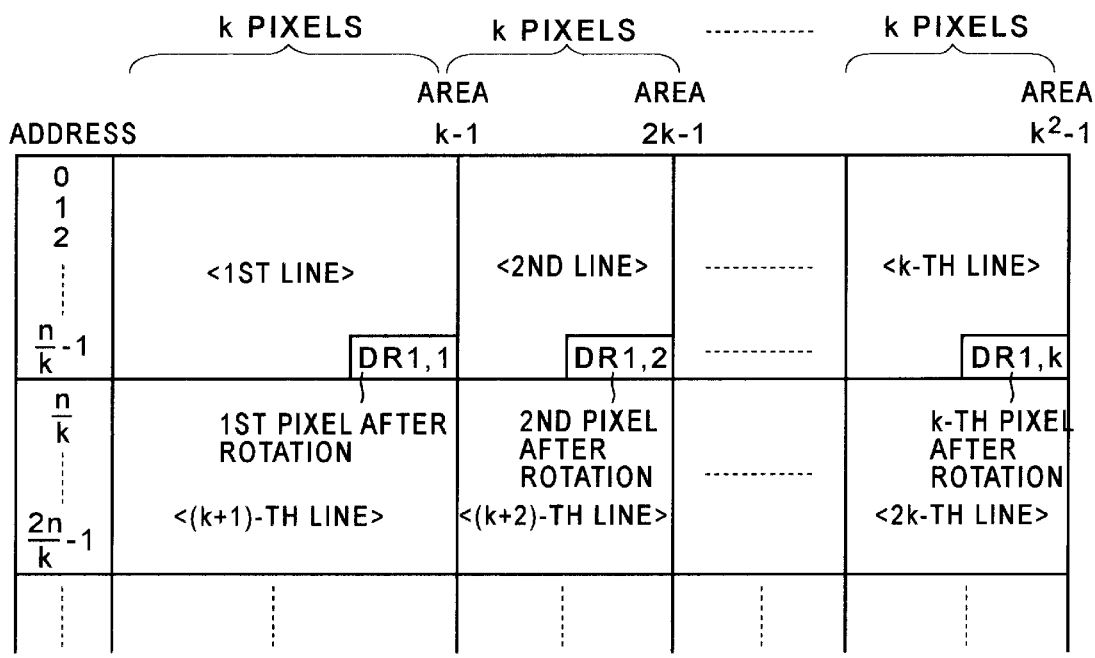
FIG. 7 is a conceptional diagram showing changes of a state storing pixels in an image memory when the original image data is rotated.

FIG. 6 shows a state where each pixel of the original image data of the first page at the start of image rotation is written. Through the operation of the area selection controller 3 and the address controller 9, the original image data of the first page is processed such that, as shown in FIG. 6, the first k pixels on the first line written in the areas 0–(k–1) as pixels DI 1, 1–DI 1, k, and the first k pixels on the second line are written in areas k–(2k–1) as pixels DI 2, 1–DI 2, k. Same is performed for the third line to the k-th line. Similarly, the next k pixels on the first line are written in the areas 0–(k–1) at address 1 as pixels DI 1, k+1–DI 1, 2k, the next k pixels on the second line are written in the areas k–(2k–1) at address 1 as pixels DI 2, k+1–DI 2, 2k. Same is performed for the third to the k-th lines. Similar write operation is performed every k pixels in the areas 0–($k^2$–1) at the addresses 2–(n/k–1) of the image memory 1 for the first to the k-th lines of the original image data. Therefore, each pixel for the first to the k-th lines of the original image data is written in the areas 0–($k^2$–1) at addresses 0–(n/k–1) of the image memory 1. Each pixel on the (k+1)-th line and thereafter is written at the address n/k of the image memory 1 and thereafter.

This write operation is performed such that the memory controller 5 generates the timing data WR for writing in the image memory 1, and supplies to the image memory 1 and the area select controller 3, and each pixel of the input image data IDATA is written at the timing of timing data WR in selected areas at addresses of the image memory 1 specified by the address data AD supplied from the address controller 9 by the area select controller 3.

Then, there is described a process for rotating the original image data of the first page by 90 degrees and writing the original image data of the second page. The rotation by 90 degrees of the original image data of the first page is conceptionally started by reading pixels D1, n, D2, n, . . . Dn, n of the n-th pixel on each line shown in FIG. 2 in this order as pixels constituting the first line after rotation by 90 degrees. The second line and thereafter after rotation are similarly read with the main scanning direction from the top end to the bottom end of FIG. 2, and the sub-scanning direction from the right end to the left end.

This read operation is performed such that the memory controller 5 generates the timing data RD for reading the image data from the image memory 1, and supplies to the image memory 1 and the area select controller 3, and each pixel of image data after rotation by 90 degrees is read at the timing of timing data RD from areas of the image memory 1 selected by the area select controller 3 at addresses specified by the address data AD supplied from the address controller 9 of the image memory 1. That is, first, the address controller 9 specifies an address (n/k−1) (see FIG. 7) of the image memory 1 with the address data AD, thereby $k^2$ pixels stored in all areas corresponding to the address being read from the image memory 1. Then, the area select controller 3 selects with the select signal MOSEL areas in which pixels DR1, 1, DR 1, 2, . . . DR 1, k constituting the first k pixels of the first line after rotation by 90 degrees are stored, that is areas (k−1), (2k−1), . . . ($k^2$−1) at the address (n/k−1) of the image memory 1 shown in FIG. 7 out of $k^2$ pixels being read, whereby the first k pixels of the first line of the output data RDATA after rotation by 90 degrees are constituted by k pixels stored in the areas and output.

Figure 8:
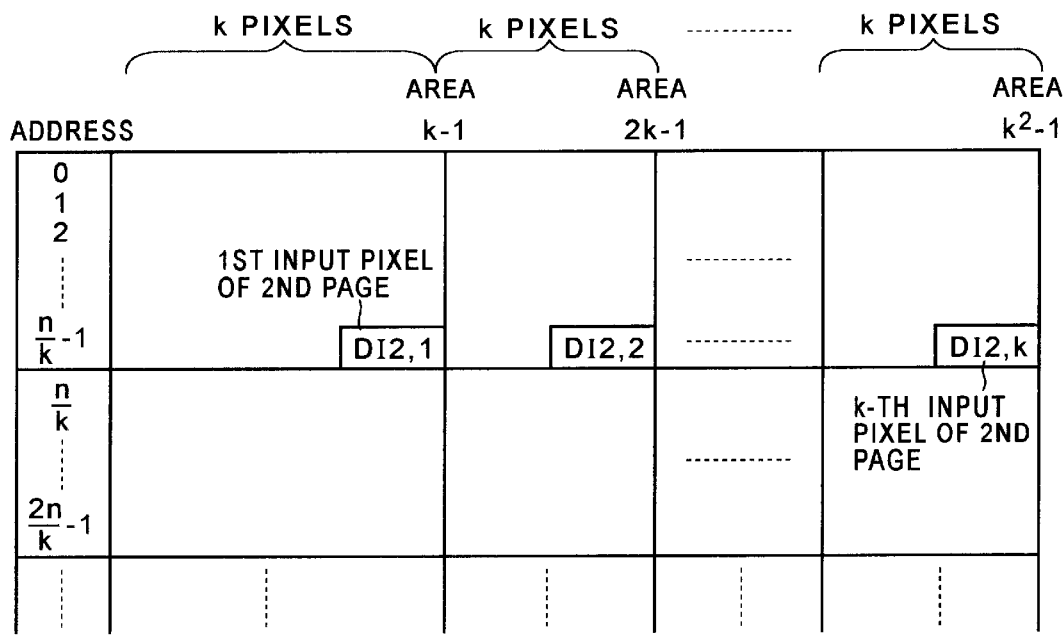
FIG. 8 is a conceptional diagram showing changes of a state storing pixels in an image memory when the original image data is rotated.

Then, after completion of the read process, a process is performed for writing the first k pixels on the fist line of the image data of the second page in the image memory 1. That is, the memory controller 5 supplies the timing data WR for writing the image data to the image memory 1 and the area select controller 3, the address controller 9 specifies an address (n/k−1) with the address data AD, and the address select controller 3 makes selection with the select signals MSEL1–MSEL4 that k pixels input as the first k pixels on the first line of the second page are stored in each of the areas of the image memory 1 in which k pixels output as the first k pixels of the output data RDATA are just stored. Thus, as shown in FIG. 8, k pixels constituting the first k pixels on the first line of the original image data of the second page are written as pixels DI 2, 1–DI 2, k in areas (k−1), (2k−1), . . . ($k^2$−1) at an addresses (n/k−1) of the image memory 1.

The area select controller 3 and the address controller 9 alternately perform reading of the image data after rotation of the first page and writing of the original image data of the second page. This fully completes writing of the original image data of the second page as reading of the image data of the first page after rotation fully completes.

As described above, since there is a case where the number of areas per line of the image memory 1 is larger than the number of pixels per line of the original image data, and areas corresponding the (m+1)-th to the n-th pixels on each line of the image memory 1 still stores pixels of the image data stores when the original image data has been rotated, this embodiment is arranged that the output device 4 does not output the lines constituted by the pixels read from these areas as the output image data RDATA.

Figure 9:
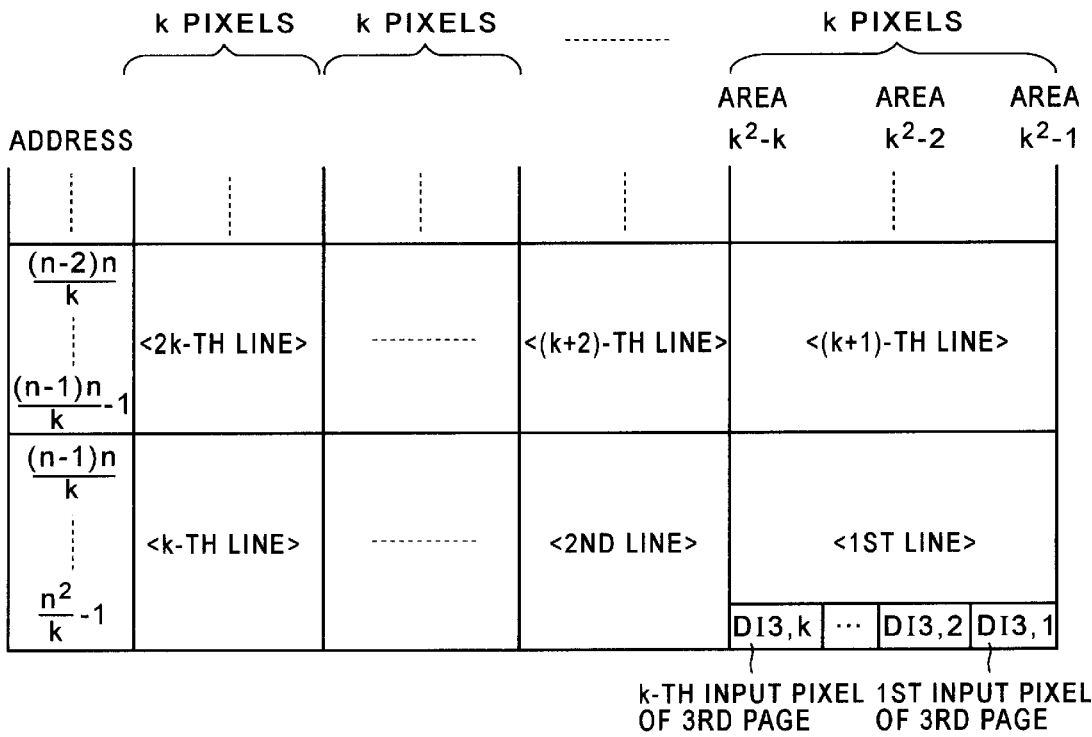
FIG. 9 is a conceptional diagram showing changes of a state storing pixels in an image memory when the original image data is rotated.
Figure 10:
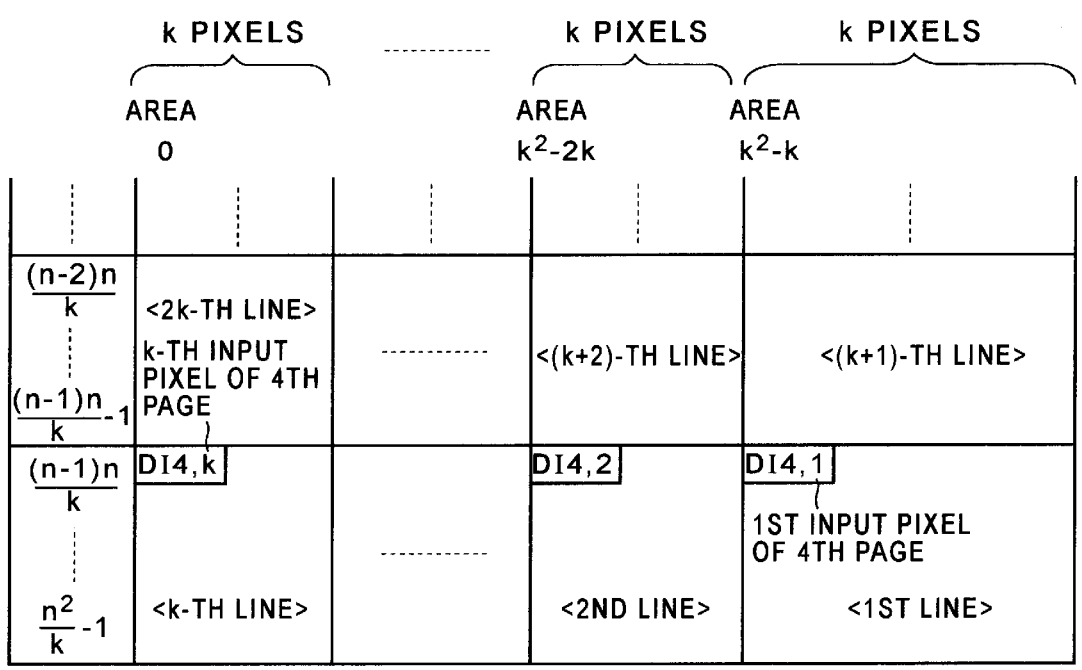
FIG. 10 is a conceptional diagram showing changes of a state storing pixels in an image memory when the original image data is rotated.

Similarly, when the original image data of the third page is being written when the image data of the second page after rotation is read, the first k pixels constituting the first line of the original image data of the third page are written in areas ($k^2$−1)−($k^2$−k) at an address ($n^2$/k−1) of the image memory 1 as pixels DI 3, 1–DI 3, k, as shown FIG. 9. Then, when the original image data of the fourth page is being written when the image data of the third page after rotation is read, the first k pixels constituting the first line of the original image data of the fourth page are written in areas ($k^2$−k), ($k^2$−2k) . . . , 0 at an address {(n−1)×n/k} of the image memory 1 as pixels DI 4, 1–DI 4, k, as shown in FIG. 10.

In addition, when the original image data of the fifth page is being written when the image data of the fourth page after rotation is read, the first k pixels constituting the first line of the original image data of the fifth page are written in areas 0–(k−1) at an address 0 of the image memory 1 shown in FIG. 6, that is the locations where the first k pixels on the first line of the original image data of the first page are written.

That is, since the storage area for each pixel is changed for the original image data in a cycle of four pages, the area select controller 3 and the address controller 9 are sufficient to control write and read of the image data in the cycle of four pages. Therefore, the page counter 6 counts pages in the cycle of four pages, and supplies the count value as the page count value PCOUNT to the area controller 3 and the address controller 9.

In addition, since the rotation of image data is performed in a unit of k lines, the line count is performed in the cycle of k lines by the line counter 9, and the count value is supplied as the count value LCOUNT to the area select controller 3 and the address controller 9.

Now, there is described a case where the original image data is rotated by 180 degrees. First, the process for writing the original image data of the first page in the image memory 1 is same as the case of rotation by 90 degrees. Then, the process for reading the image data of the first page after the rotation by 180 degrees is started by reading pixels Dn, n, Dn, n−1, . . . , Dn, 1 on the n-th line shown in FIG. 2 in this order as pixels constituting the first line after rotation by 180 degrees. The second line and thereafter after rotation are similarly read with the main scanning direction from the right end to the left end of FIG. 2, and the sub-scanning direction from the top end to the bottom end.

This reading order is similar to that of the reading process of image data of the second page in rotation by 90 degrees, and that of the writing process of original image data of the third page as shown in FIG. 9. Therefore, the control procedure of the area select controller 3 and the address controller 9 on the processes for reading the image data of the first page after rotation and writing the original image data of the second page in the rotation by 180 degrees is similar to that on the processes for reading the image data of the second page after rotation and writing the original image data of the third page in the rotation by 90 degrees. Furthermore, under the same reason, the control procedure of the area select controller 3 and the address controller 9 on the processes for reading the image data of the second page after rotation and writing the original image data of the third page in the rotation by 180 degrees is similar to that on the processes for reading the image data of the fourth page after rotation and writing the original image data of the fifth page in the rotation by 90 degrees shown in FIG. 6.

That is, in the case of rotation by 180 degrees, since the storage area for each pixel is changed for the original image data in a cycle of two pages, the area select controller 3 and the address controller 9 are sufficient to control write and read of the image data in the cycle of two pages.

Now, there is described a case where the original image data is rotated by 270 degrees. First, the process for writing the original image data of the first page in the image memory 1 is same as the case of rotation by 90 degrees. Then, the process for reading the image data of the first page after the rotation by 270 degrees is started by reading first pixels Dn, 1, Dn−1, 1, . . . , D1, 1 on each line shown in FIG. 2 in this order as pixels constituting the first line after rotation by 270 degrees. The second line and thereafter after rotation are similarly read with the main scanning direction from the bottom end to the top end of FIG. 2, and the sub-scanning direction from the left end to the right end.

This reading order is similar to that of the reading process of image data of the third page in rotation by 90 degrees, and that of the writing process of the original image data of the fourth page as shown in FIG. 10. Therefore, the control procedure of the area select controller 3 and the address controller 9 on the processes for reading the image data of the first page after rotation and writing the original image data of the second page in the rotation by 270 degrees is similar to that on the processes for reading the image data of the third page after rotation and writing the original image data of the fourth page in the rotation by 90 degrees. Furthermore, under the same reason, the control procedure of the area select controller 3 and the address controller 9 on the processes for reading the image data of the second page after rotation and writing the original image data of the third page in the rotation by 270 degrees is similar to that on the processes for reading the image data of the second page after rotation and writing the original image data of the third page in the rotation by 90 degrees shown in FIG. 9.

That is, in the case of rotation by 270 degrees, change of storage state of pixels in the image memory 1 is performed in the order of FIGS. 10, 9, 8, 7, 6 and 10 which is completely reverse to the order of FIGS. 7–10 and 6 in the case of rotation by 90 degrees. Therefore, the control procedure of the area select controller 3 and the address controller 9 in the case of rotation by 270 degrees is completely reverse to the control procedure in the case of rotation by 90 degrees.

Now, there is described detail of image rotation by referring to the flowcharts shown in FIGS. 11, 13, 15 and 17, and the conceptional diagrams of change of storage state in the image memory 1 shown in FIGS. 12, 14, 16 and 18–24.

Figure 11:
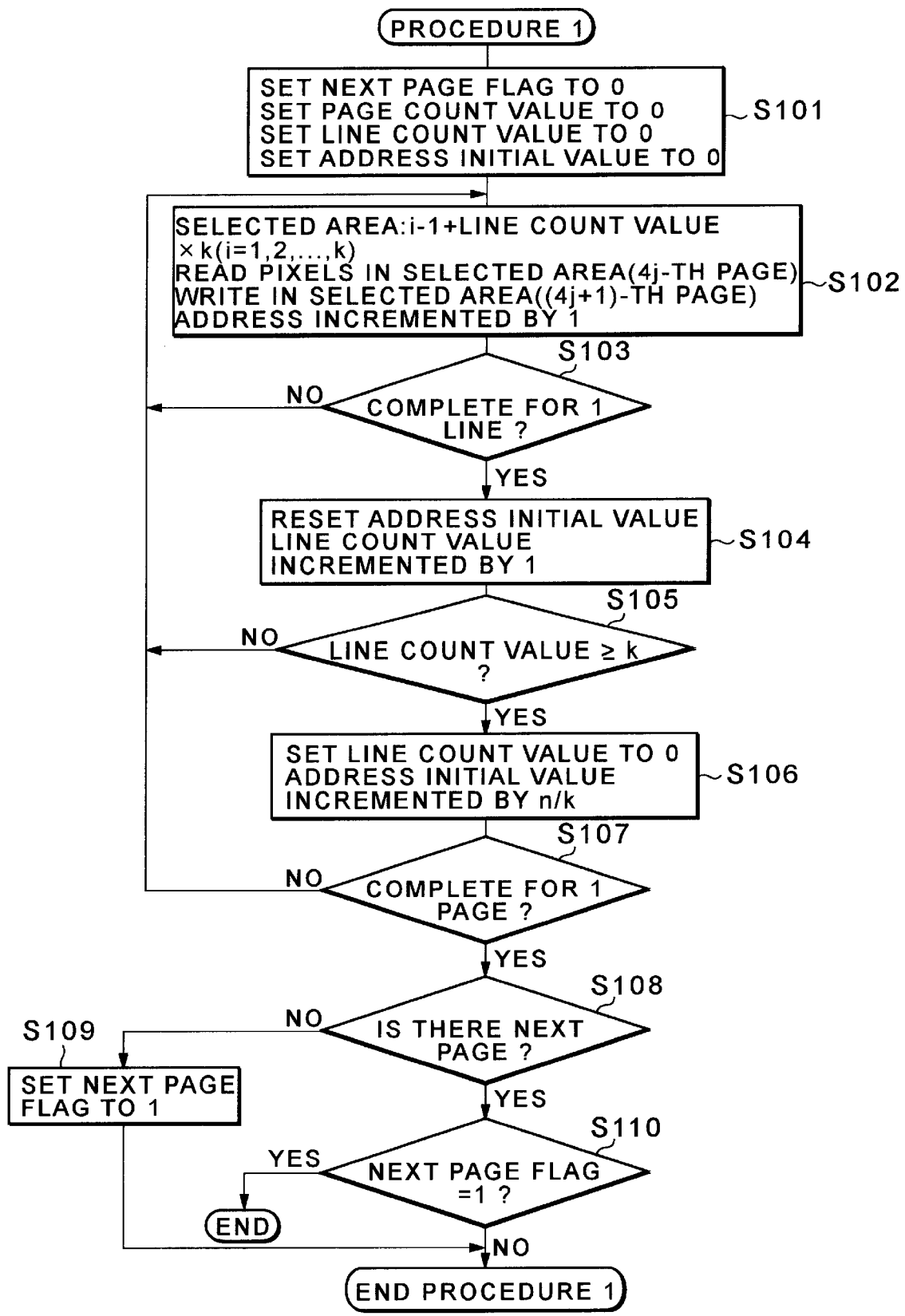
FIG. 11 is a flowchart representing an image rotating process.
Figure 12:
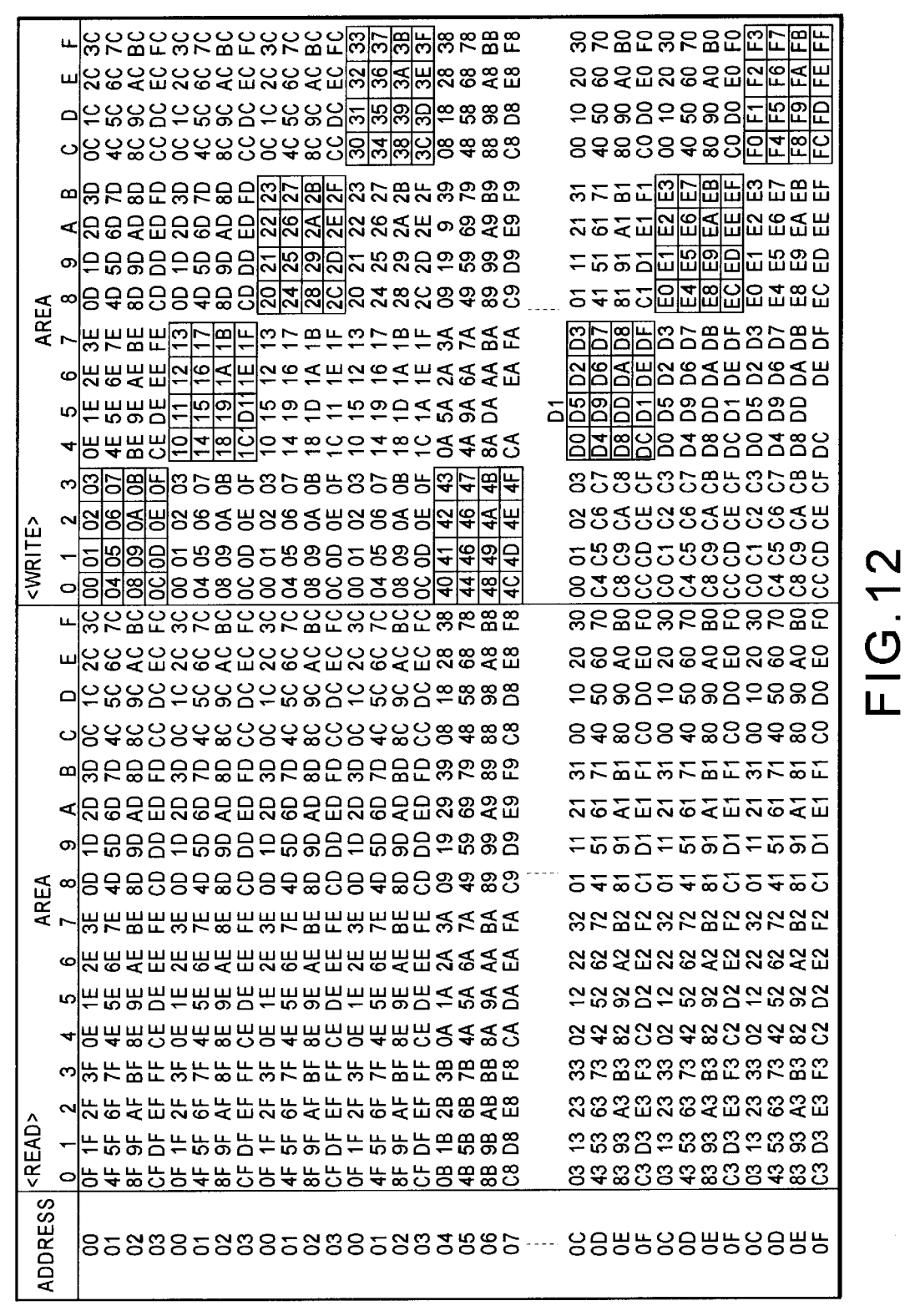

(1) First, description is given on the processes for reading image data of the 4j-th (j=0, 1, 2, . . . ) page after rotation and writing the original image data of the (4j+1)-th page (procedure 1) in the rotation by 90 degrees by referring to the flowchart shown in FIG. 11 and the conceptional diagram of change of storage state in the image memory 1 shown in FIG. 12.

Step S101 in FIG. 11 sets, as the initialization, a next page flag to 0, which is set to 0 if there a next page of the original image to be rotated, and to 1 if there is no next page, and the page count value PCOUNT of the page counter 6 and the line count value LCOUNT of the line counter 8 to 0. In addition, the operation controller 7 supplies the rotation mode data RTMODE which is information on the size of original image data, an angle (here, 90 degrees) by which the original image data should be rotated and the like to the area selection controller 3 and the address controller 9, and also supplies the line information to the line counter 8. This causes an address initial value setting section 10 of the address controller 9 shown in FIG. 4 to generate 00 (hexadecimal) as the address initial value (see the top row of FIG. 12). Then, the process proceeds to step S102.

Here, in the above initialization, the process for setting the next page flag to 0 is performed only when procedure 1 is executed as a process for writing the original image data of the first page, and is not performed when procedure 1 is executed as a process for writing the original image data of the second page and thereafter. It is because, otherwise, there is no meaning to determine in the following step S110 whether or not the next page flag is set to 1.

In step S102, the memory controller 5 generates the timing data RD and supplies to the image memory 1 and the area select controller 3, and the address controller 9 specifies address 00 (hexadecimal) of the image memory 1 with the generated address data AD (see FIG. 12), thereby $k^2$ pixels which is 4×4=16 pixels here because k=4 stored in all areas corresponding to the address 00 being read from the image memory 1. Then, the area selection controller 3 selects k pixels read from areas (i+line count value LCOUNT×k−1) (i=1, 2, . . . , k) out of 16 pixels being read with the select signal MOSEL, and constitutes the first k pixels on the first line of the 4j-th page after rotation by 90 degrees. In this case, since k=4, and LCOUNT=0, four pixels 0F, 1F, 2F and 3F are selected from the areas 0–3 at address 00 as shown at <READ> in FIG. 12.

Then, the memory controller 5 generates the timing data WD and supplies to the image memory 1 and the area select controller 3, the address controller 9 specifies the same address 00 as above, and the area select controller 3 selects the same areas as above with the select signals MSEL1–MSEL4, whereby the first k pixels, 4 pixels in this case, on the first line of the original image data of the (4j+1)-th page are written in the areas 0–3 at address 00 as pixels 00, 01, 02 and 03. Then, the address controller 9 supplies new address data AD the value of which is decremented by 1, 01 (hexadecimal) in this case, to the image memory 1, and the process proceeds to step S103.

Step S103 determines whether or not the process of step S102 completes for one line. It is determined by whether or not the process of step S102 is repeated by n/k. In this case, since n=16 and k=4, it is determined whether the process is repeated four times. If the determination in step S103 is "NO," the process returns to step S102 where the same process as above is repeated on the new address 01. Then, if the determination in step S103 is "YES," that is, if the process of step S102 is repeated by n/k times, four in this case, and the process for one line completes, that is, if reading of pixels 00–0F on the first line of the image data of the 4j-th page completes as indicated at the upper left of <READ> in FIG. 12, and writing of pixels 00–0F on the first line of the original image of the (4j+1)-th page completes as enclosed in a block at the upper left of <WRITE> in FIG. 12, the determination in step S103 becomes "YES," and the process proceeds to step S104. In step S104, to perform read and write of pixels on the next line, the address controller 9 again generates 00 as the address initial value, and then increments the line count value LCOUNT of the line counter 8 by 1. Then, the process proceeds to step S105.

Step S105 determines whether or not the line count value LCOUNT is k, four in this case, or lager. If the determination is "NO," the process returns to step S102 where the processes of steps S102–S104 are repeated. Then, when the processes of steps S102–S104 are repeated k times, four times in this case, whereby the line count value LCOUNT becomes k, four in this case, or larger, the determination in step S105 becomes "YES," and the process proceeds to step S106.

Step S106 sets the line count value LCOUNT of the line counter 8 to 0, and the address controller 9 increments the address initial value by n/k. Since it is incremented by four in this case, the address initial value is set to 04. Then, the process proceeds to step S107.

Step S107 determines whether or not the processes of steps S102–S106 complete for one line. It is determined by whether or not the processes of steps S102–S106 are repeated by n/k. In this case, since n=16 and k=4, it is determined whether the process is repeated four times. If the determination in step S107 is "NO," the process returns to step S102 where the same processes of steps S102–S106 are repeated. Then, when the processes of steps S102–S104 are repeated n/k times, four times in this case, and complete for one page, the determination in step S107 becomes "YES," and the process proceeds to step S108.

Step S108 determines whether or not there is the original image data of the next page to be rotated. If the determination is "NO," the process proceeds to step S109 where it sets the next page flag to 1, and completes the process of procedure 1. On the other hand, if the determination in step S108 is "YES," that is, if there is the original image data of the next page, the process proceeds to step S110. Step S110 determines whether or not the next page flag is 1. If the determination is "YES," the rotation of original image data fully completes. On the other hand, if the determination in step S110 is "NO," that is, if the next page flag is set to 0, the process of procedure 1 completes. Here, while the above process reads the image data after the rotated image data of the 4j-th page when the original image data of the (4j+1)-th page is written, since j=0, the rotated image data of the 0-th page is the image data when the original image data is previously rotated as described above, it cannot be output as the output image data RDATA as is from the output device 4. Then the embodiment arranges the output device 4 not to output the rotated image data of the 0-th page.

Figure 13:
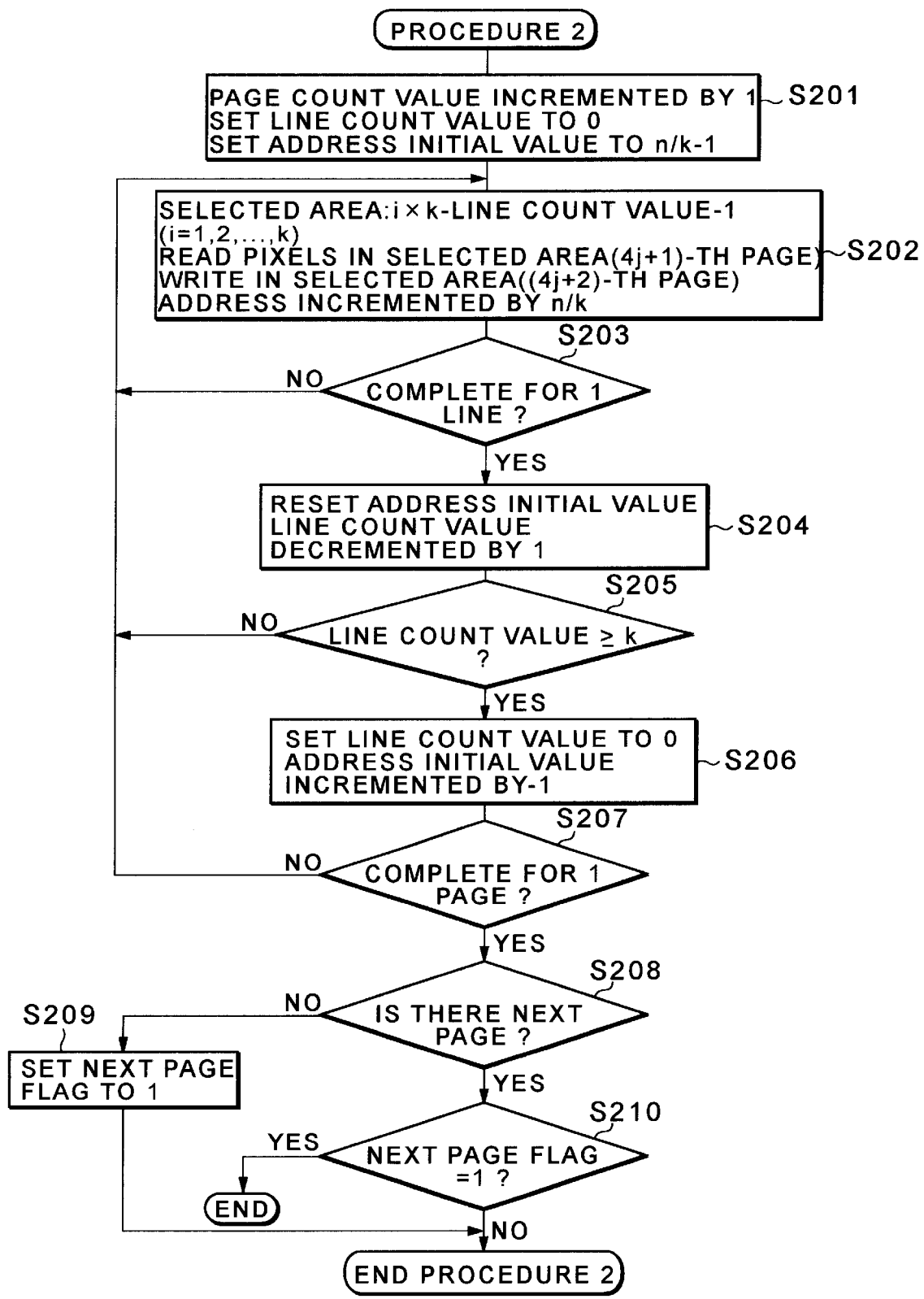
FIG. 13 is a flowchart representing an image rotating process.
Figure 14:
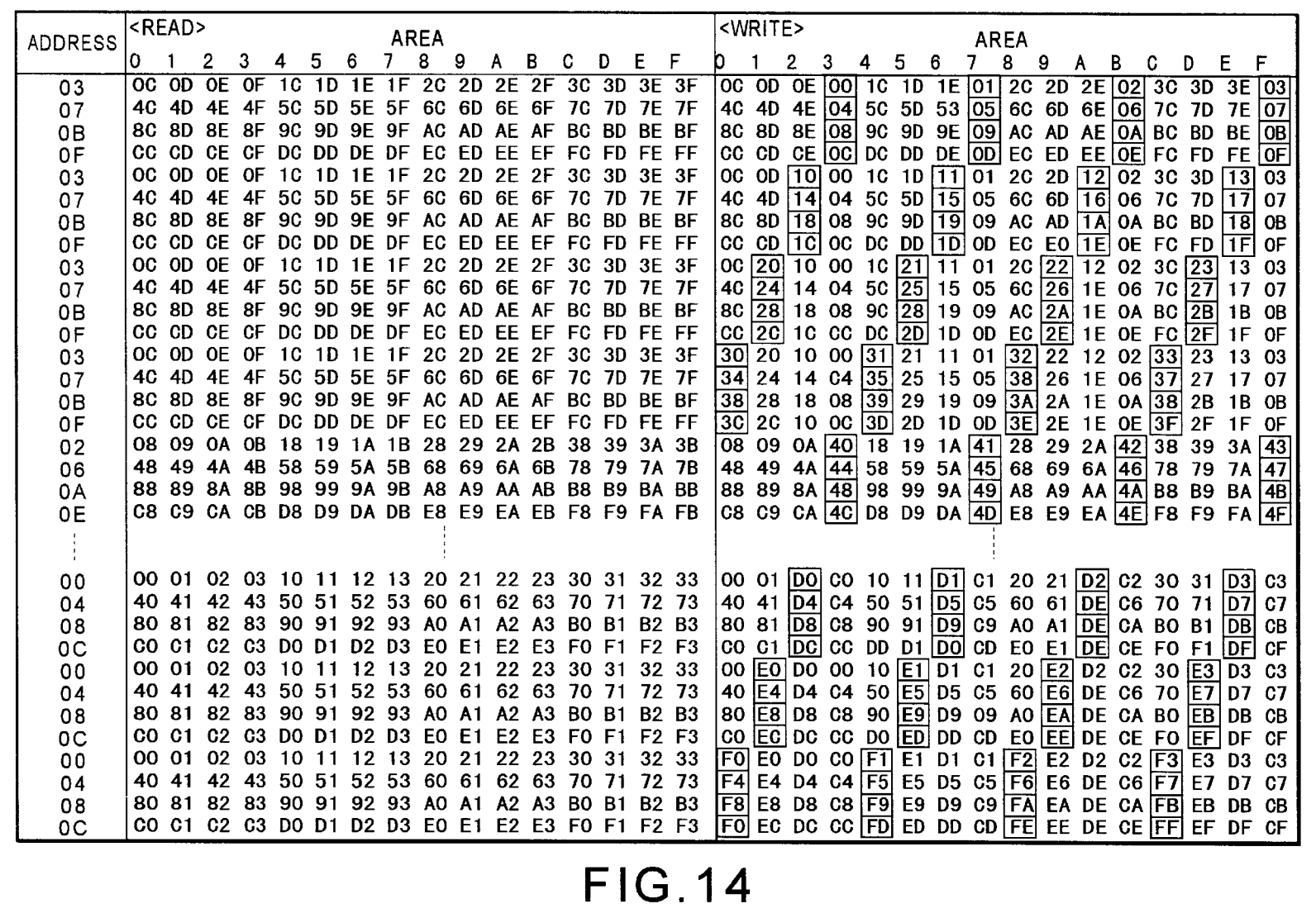

(2) Then, there is described the processes for reading the image data of the (4j+1)-th pate after rotation and writing the original image data of the (4j+2)-th page in the rotation by 90 degrees by referring to the flowchart shown in FIG. 13 and the conceptional diagram of change of storage state in the image memory 1 shown in FIG. 14.

Step S201 in FIG. 13 increments the page count value PCOUNT by 1 in the page counter 6, and sets the line count value LCOUNT of the line counter 8 to 0. Furthermore, the address initial value setting section 10 of the address controller 9 generates (n/k−1), 03 (hexadecimal) in this case (see the top row of FIG. 14). Then, the process proceeds to step S202.

In step S202, the memory controller 5 generates the timing data RD and supplies to the image memory 1 and the area select controller 3, and the address controller 9 specifies address (n/k−1), 03 in this case, with the generated address data AD (see FIG. 14), thereby $k^2$ pixels which are stored in all areas corresponding to the address 03, 16 pixels in this case, being read from the image memory 1. Then, the area select controller 3 selects k pixels read from areas (i×k−line count value LCOUNT−1) (i=1, 2, . . . , k) out of 16 pixels being read with the select signal MOSEL, and constitutes the first line of the (4j+1)-th page after rotation by 90 degrees or 270 degrees. In this case, since k=4, and LCOUNT=0, four pixels 0F, 1F, 2F and 3F are selected from areas 3, 7, B and F at the address 03 as shown in <READ> in FIG. 14.

Then, the memory controller 5 generates the timing data WD and supplies to the image memory 1 and the area select controller 3, the controller 9 specifies the same address 03 as above, and the area select controller 3 selects the same areas as above with the select signals MSEL1–MSEL4, whereby the first k pixels, four in this case, on the first line of the original image data of the (4j+2)-th page are written in the areas 3, 7, B and F at the address 03 as pixels 00, 01, 02 and 03 as indicated by <WRITE> in FIG. 14. Then, the address controller 9 supplies new address data AD the value of which is incremented by (n/k), 07 in this case, to the image memory 1, and the process proceeds to step S203.

Step S203 determines whether or not the process of step S202 completes for one line. It is determined by whether or not the process of step S202 is repeated by n/k times. In this case, it determines whether or not the process is repeated by four times. If the determination in step S203 is "NO," the process returns to step S202 where the same process as above is repeated on the new address 07. Then, if the determination in step S203 is "YES," that is, if the process of step S202 is repeated by n/k times, four in this case, and the process for one line completes, that is, if reading of pixels on the first line of the image data of the (4j+1)-th page from the areas 3, 7, B and F at the top end of <READ> in FIG. 14 completes, and writing of pixels 00–0F on the first line of the original image data of the (4j+2)-th page in the top areas 3, 7, B and F of <WRITE> in FIG. 14 completes as enclosed in a block, the determination in step S203 becomes "YES," and the process proceeds to step S204. In step S204, to perform read and write of pixels on the next line, the address controller 9 again generates 03 as the address initial value, and then increments the line count value LCOUNT of the line counter 8 by 1. Then, the process proceeds to step S205.

Step S205 determines whether or not the line count value LCOUNT is k, four in this case, or lager. If the determination is "NO," the process returns to step S202 where the processes of steps S202–S204 are repeated. Then, when the processes of steps S202–S204 are repeated k times, four times in this case, whereby the line count value LCOUNT becomes k, four in this case, or larger, the determination in step S205 becomes "YES," and the process proceeds to step S206.

Step S206 sets the line count value LCOUNT of the line counter 8 to 0, and the address controller 9 decrements the address initial value by 1. In this case, the address initial value is set to 02. Then, the process proceeds to step S207.

Step S207 determines whether or not the processes of steps S202–S206 completes for one page. It is determined by whether or not the processes of steps S202–S206 are repeated by n/k times. In this case, it determines whether or not the process is repeated by four times. If the determination in step S207 is "NO," the process returns to step S202 where the processes of steps S202–S206 are repeated. Then, when the processes of steps S202–S206 are repeated n/k times, four times in this case, and complete for one page, the determination in step S207 becomes "YES," and the process proceeds to step S208.

Step S208 determines whether or not there is the original image data of the next page to be rotated. If the determination is "NO," step S209 sets 1 to the next page flag, and completes the process of procedure 2. On the other hand, if the determination in step S208 is "YES," that is, if there is the original image data of the next page, the process proceeds to step S210. Step S210 determines whether or not the next page flag is 1. If the determination is "YES," the rotation of original image data fully completes. On the other hand, if the determination in step S210 is "NO," that is, if the next page flag is set to 0, the process of procedure 2 completes.

Figure 15:
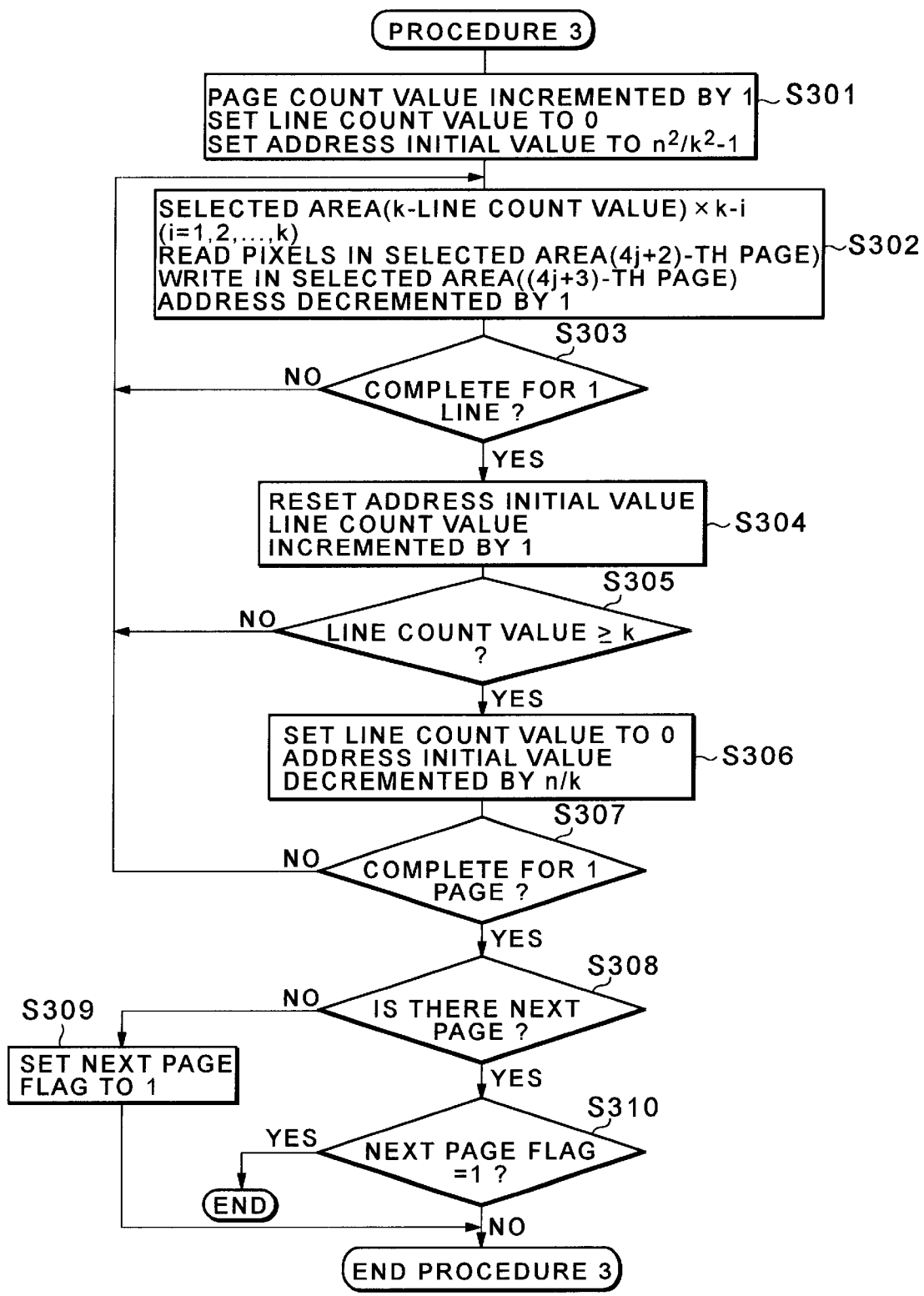
FIG. 15 is a flowchart representing an image rotating process.
Figure 16:
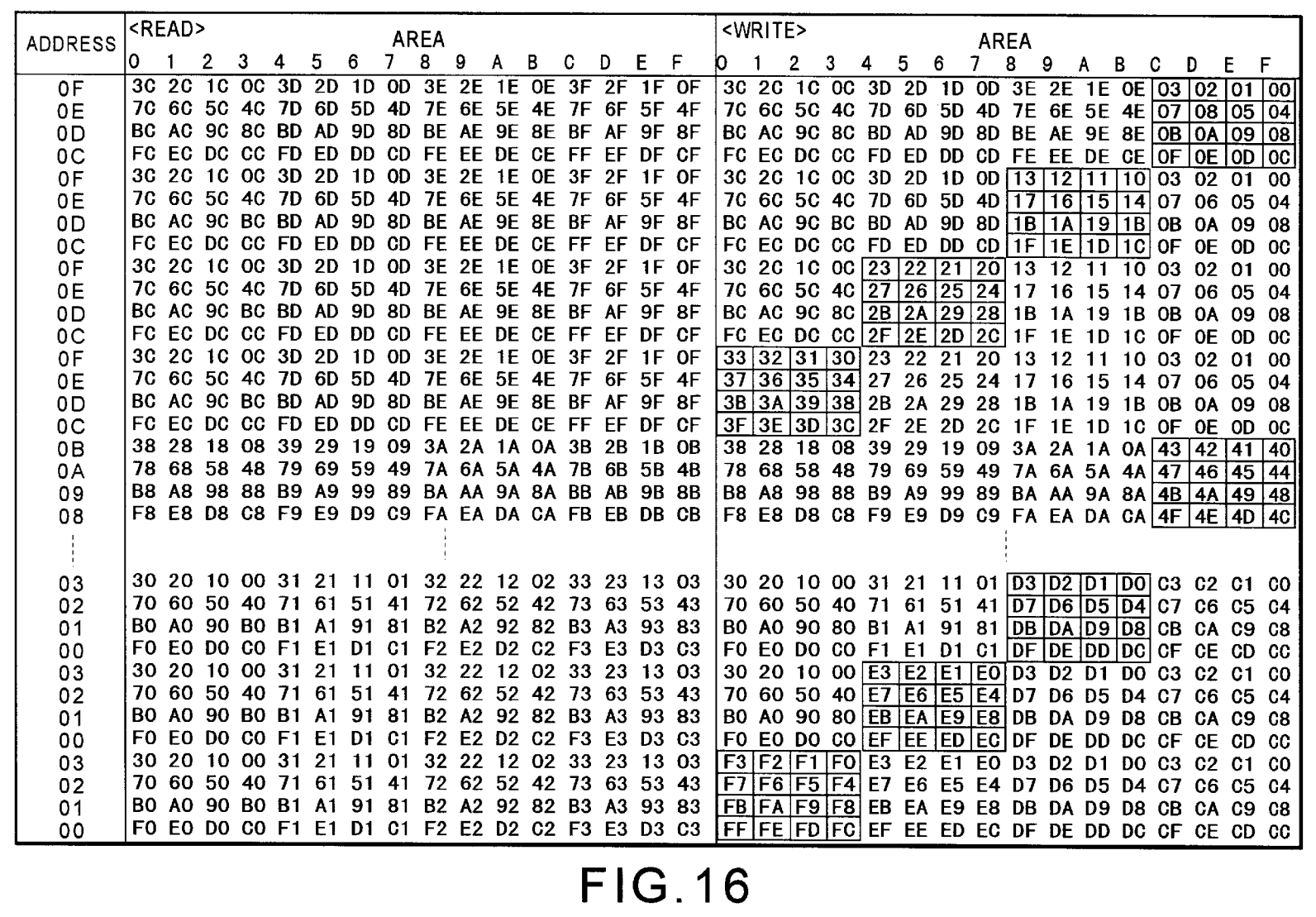

(3) Then, there is described the processes for reading the image data of the (4j+2)-th page after rotation and writing the original image data of the (4j+3)-th page in the rotation by 90 degrees by referring to the flowchart shown in FIG. 15 and the conceptional diagram of change of storage state in the image memory 1 shown in FIG. 16.

Step S301 in FIG. 13 increments the page count value PCOUNT by 1 in the page counter 6, and sets the line count value LCOUNT of the line counter 8 to 0. Furthermore, the address initial value setting section 10 of the address controller 9 generates $(n^2/k^2-1)$, 0F (hexadecimal) in this case (see the top row of FIG. 16). Then, the process proceeds to step S302.

In step S302, the memory controller 5 generates the timing data RD and supplies to the image memory 1 and the area select controller 3, and the address controller 9 specifies address $(n^2/k^2-1)$, 0F in this case, with the generated address data AD (see FIG. 16), thereby $k^2$ pixels which are stored in all areas corresponding to the address 0F, 16 pixels in this case, being read from the image memory 1. Then, the area select controller 3 selects k pixels read from areas {(k–line count value LCOUNT)×k–i) (i=1, 2, . . . , k) out of 16 pixels being read with the select signal MOSEL, and constitutes the first line of the (4j+2)-th page after rotation by 90 degrees. In this case, since k=4, and LCOUNT=0, four pixels 0F, 1F, 2F and 3F are selected from areas F, E, D and C at the address 0F as shown in <READ> in FIG. 16.

Then, the memory controller 5 generates the timing data WD and supplies to the image memory 1 and the area select controller 3, the address controller 9 specifies the same address 0F as above, and the area select controller 3 selects the same areas as above with the select signals MSEL1–MSEL4, whereby the first k pixels, four in this case, on the first line of the original image data of the (4j+3)-th page are written in the areas F, E, D and C at the: address of 0F as pixels 00, 01, 02 and 03 as indicated by <WRITE> in FIG. 16. Then, the address controller 9 supplies new address data AD the value of which is decremented by 1, 0E in this case, to the image memory 1, and the process proceeds to step S303.

Step S303 determines whether or not the process of step S302 completes for one line. It is determined by whether or not the process of step S302 is repeated by n/k times. In this case, it determines whether or not the process is repeated by four times. If the determination in step S303 is "NO," the process returns to step S302 where the same process as above is repeated on the new address 07. Then, if the determination in step S303 is "YES," thatlis, if the process of step S302 is repeated by n/k times, four in this case, and the process for one line completes, that is, if reading of pixels on the first line of the image data of the (4j+2)-th page from the areas C–F at the top end of <READ> in FIG. 16 completes, and writing of pixels 00–0F at the top area completes as enclosed in a block of <WRITE> in FIG. 16, the determination in step S303 becomes "YES," and the process proceeds to step S304. In step S304, to perform read and write of pixels on the next line, the address controller 9 again generates 0F as the address initial value, and then increments the line count value LCOUNT of: the line counter 8 by 1. Then, the process proceeds to step S305.

Step S305 determines whether or not the line count value LCOUNT is k, four in this case, or lager. If the determination is "NO," the process returns to step S302 where the processes of steps S302–S304 are repeated. Then, when the processes of steps S302–S304 are repeated k times, four times in this case, whereby the line count value LCOUNT becomes k, four in this case, or larger, the determination in step S305 becomes "YES," and the process proceeds to step S306.

Step S306 sets the line count value LCOUNT of the line counter 8 to 0, and the address controller 9 decrements the address initial value by n/k. In this case, the address initial value is set to 0B. Then, the process proceeds to step S307.

Step S307 determines whether or not the processes of steps S302–S306 complete for one page. It is determined by whether or not the processes of steps S302–S306 are repeated by n/k times. In this case, it determines whether or not the process is repeated by four times. If the determination in step S307 is "NO," the process returns to step S302 where the processes of steps S302–S306 are repeated. Then, when the processes of steps S302–S306 are repeated n/k times, four times in this case, and complete for one page, the determination in step S307 becomes "YES," and the process proceeds to step S308.

Step S308 determines whether or not there is the original image data of the next page to be rotated. If the determination is "NO," the process proceeds to step S309 where it sets the next page flag to 1, and completes the process of procedure 3. On the other hand, if the determination in step S308 is "YES," that is, if there is the original image data of the next page, the process proceeds to step S310. Step S310 determines whether or not the next page flag is 1. If the determination is "YES," the rotation of original image data fully completes. On the other hand, if the determination in step S310 is "NO," that is, if the next page flag is set to 0, the process of procedure 3 completes.

Figure 17:
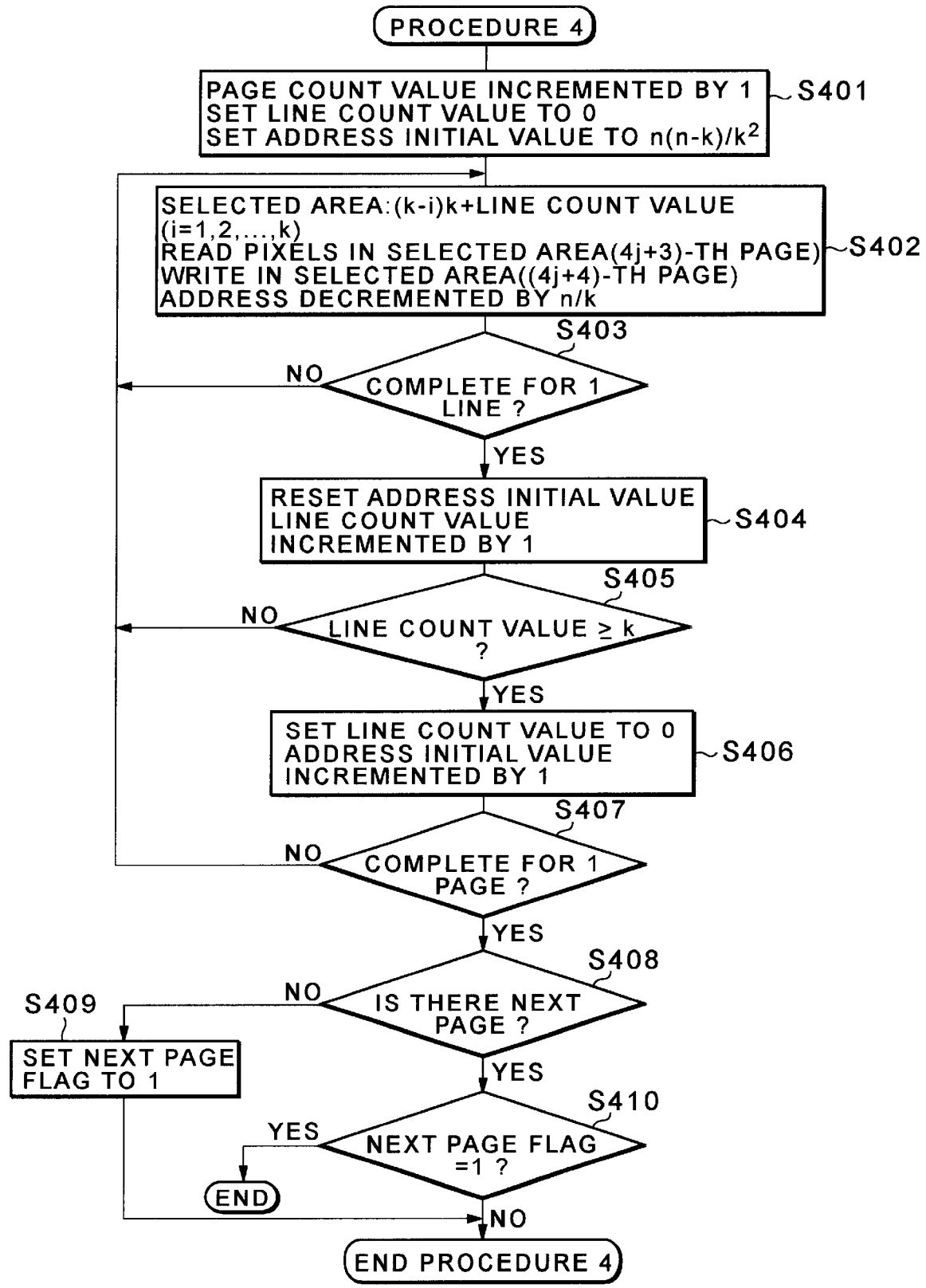
FIG. 17 is a flowchart representing an image rotating process.
Figure 18:
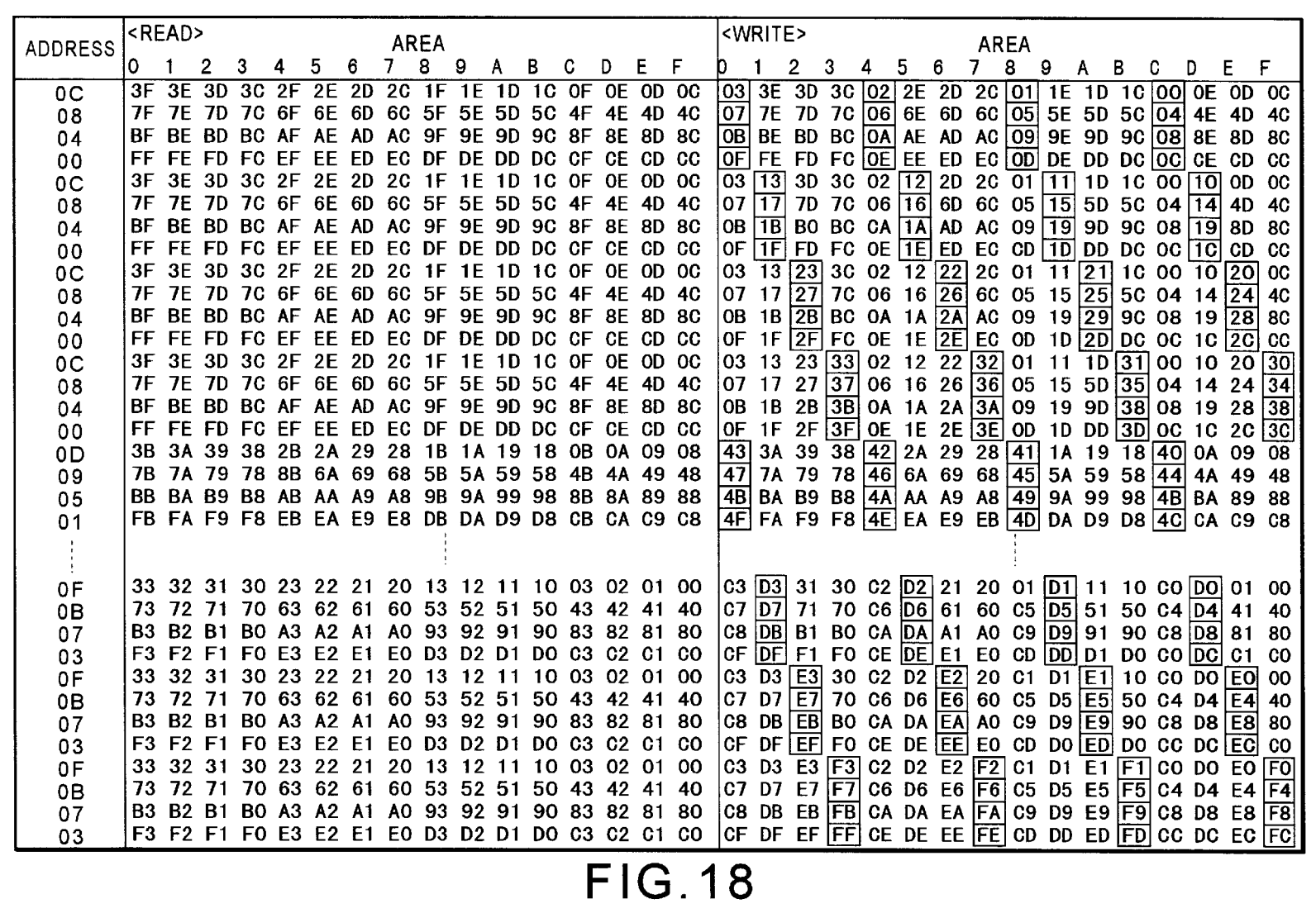

(4) Then, there is described the processes for reading the image data of the (4j+3)-th page after rotation and writing the original image data of the (4j+4)-th page in the rotation by 90 degrees by referring to the flowchart shown in FIG. 17 and the conceptional diagram of change of storage state in the image memory 1 shown in FIG. 18.

Step S401 in FIG. 17 increments the page count value PCOUNT by 1 in the page counter 6, and sets the line count value LCOUNT of the line counter 8 to 0. Furthermore, the address initial value setting section 10 of the address controller 9 generates $n(n-k)/k^2$, 0C (hexadecimal) in this case (see the top row of FIG. 18). Then, the process proceeds to step S402.

In step S402, the memory controller 5 generates the timing data RD and supplies to the image memory 1 and the area select controller 3, and the address controller 9 specifies address $n(n-k)/k^2$, 0C in this case, with the generated address data AD (see FIG. 18), thereby $k^2$ pixels stored in all areas corresponding to the address 0C being read from the image memory 1. Then, the area select controller 3 selects k pixels read from the areas {(k–i)×k+line count value LCOUNT} (i=1, 2, . . . , k) output the read 16 pixels, and constitutes the first line of the (4j+3)-th page after rotation by 90 degrees or 270 degrees. In this case, since k=4, and LCOUNT=0, four pixels 0F, 1F, 2F and 3F are selected from areas C, 8, 4 and 0 at the address 0C as shown in <READ> in FIG. 18.

Then, the memory controller 5 generates the timing data WD and supplies to the image memory 1 and the area select controller 3, the address controller 9 specifies the same address 0C as above, and the area select controller 3 selects the same areas as above with the select signals MSEL1–MSEL4, whereby the first k pixels, four in this case, on the first line of the original image data of the (4j+4)-th page are written in the areas , 8, 4 and 0 at the address 0C as pixels 00, 01, 02 and 03 as indicated by <WRITE> in FIG. 18. Then, the address controller 9 supplies new address data AD the value of which is decremented n/k, 08 in this case, to the image memory 1, and the process proceeds to step S403.

Step S403 determines whether or not the process of step S402 completes for one line. It is determined by whether or not the process of step S402 is repeated by n/k times. In this case, it determines whether or not the process is repeated by four times. If the determination in step S403 is "NO," the process returns to step S402 where the same process as above is repeated on the new address 08. Then, if the determination in step S403 is "YES," that is, if the process of step S402 is repeated by n/k times, four times in this case, and the process for one line completes, that is, if reading of pixels on the first line of the image data of the (4j+3)-th page from the areas C, 8, 4 and 0 at the top end of <READ> in FIG. 18 completes, and writing of pixels 00–0F in the top areas C, 8, 4 and 0 of <WRITE> in FIG. 18 completes as enclosed in a block, the determination in step S403 becomes "YES," and the process proceeds to step S404. In step S404, to perform read and write of pixels on the next line, the address controller 9 again generates 0C as the address initial value, and then increments the line count value LCOUNT of the line counter 8 by 1. Then, the process proceeds to step S405.

Step S405 determines whether or not the line count value LCOUNT is k, four in this case, or lager. If the determination is "NO," the process returns to step S402 where the processes of steps S402–S404 are repeated. Then, when the processes of steps S402–S404 are repeated k times, four times in this case, whereby the line count value LCOUNT becomes k, four in this case, or larger, the determination in step S405 becomes "YES," and the process proceeds to step S406.

Step S406 sets the line count value LCOUNT of the line counter 8 to 0, and the address controller 9 increments the address initial value by 1. In this case, the address initial value is set to 0D. Then, the process proceeds to step S407.

Step S407 determines whether or not the processes of steps S402–406 complete for one page. It is determined by whether or not the processes of steps S402–406 is repeated by n/k times. In this case, it determines whether or not the process is repeated by four times. If the determination in step S407 is "NO," the process returns to step S402 where the processes of steps S402–S406 are repeated. Then, when the processes of steps S402–S406 are repeated n/k times, four times in this case, and complete for one page, the determination in step S407 becomes "YES," and the process proceeds to step S408.

Step S408 determines whether or not there is the original image data of the next page to be rotated. If the determination is "NO," the process proceeds to step S409 where it sets the next page flag to 1, and completes the process of procedure 4. On the other hand, if the determination in step S408 is "YES," that is, if there is the original image data of the next page, the process proceeds to step S410. Step S410 determines whether or not the next page flag is 1. If the determination is "YES," the rotation of original image data fully completes. On the other hand, if the determination in step S410 is "NO," that is, if the next page flag is set to 0, the process of procedure 4 completes.

The storage state of the image data of the (4j+4)-th page in the image memory 1 by procedure 4 just described is same as that of the image data of the 4j-th page read from the image memory 1 by procedure 1 as indicated by <WRITE> in FIG. 18 and <READ> in FIG. 12. For example, pixels stored in all areas at the bottom address 0C in <WRITE> in FIG. 18 are the same as pixels stored in all areas at address 03, the fourth address from the top, in <READ> in FIG. 12. Therefore, reading of image data of the 4j-th page after rotation is performed according to procedure 1 shown in FIG. 11.

Figure 19:
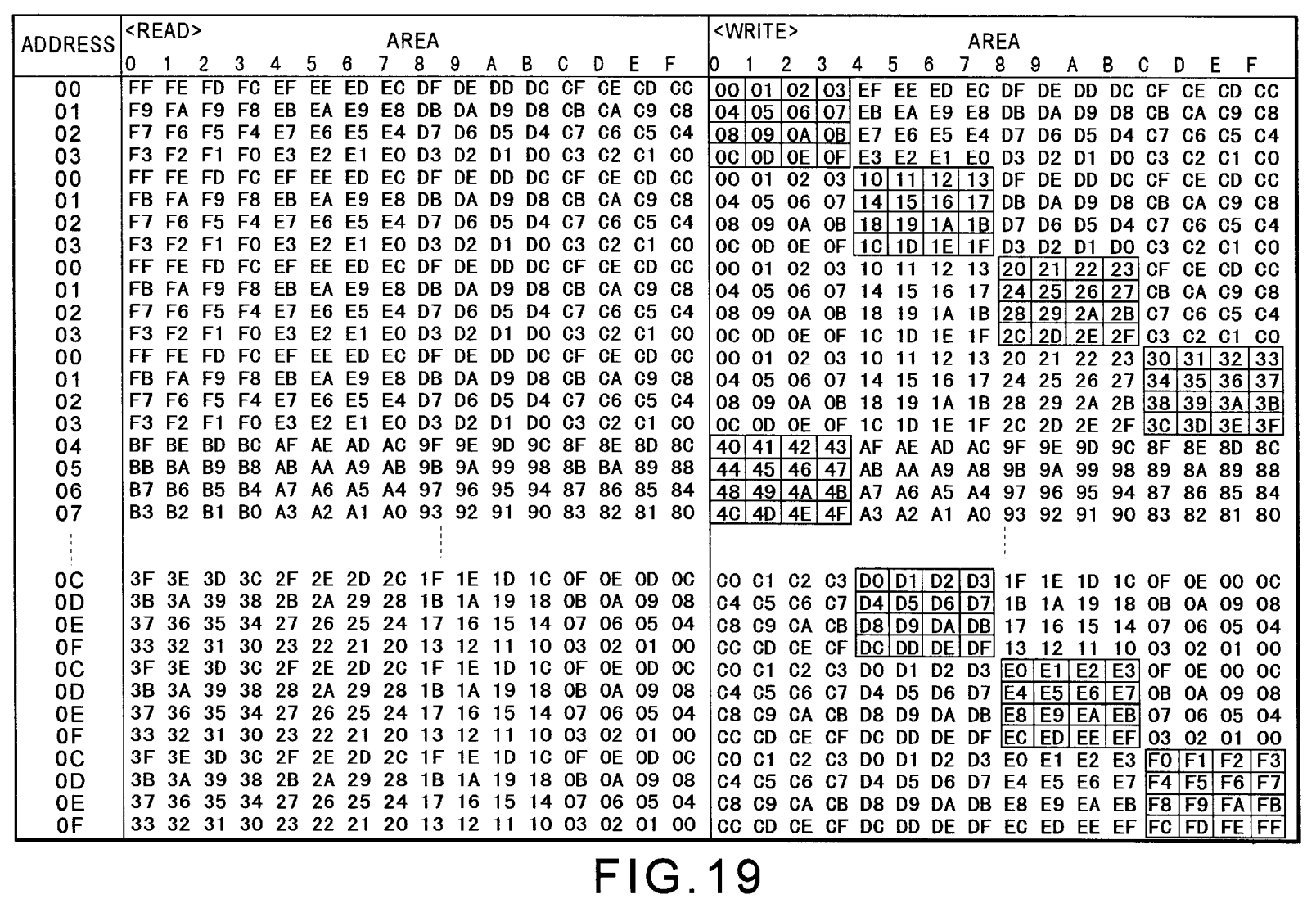
Figure 20:
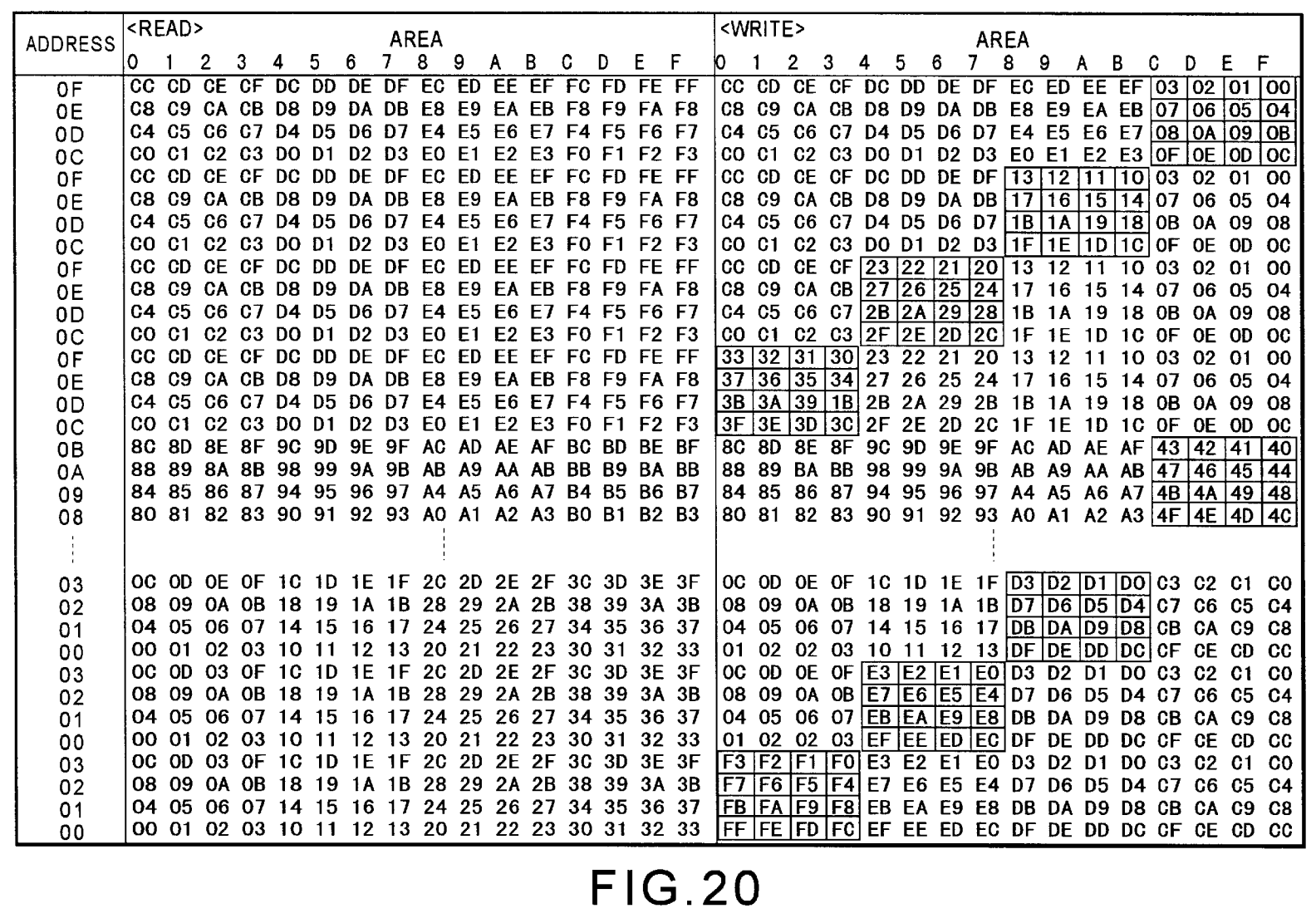

(5) Then, there is described the processes for writing the original image data in the rotation by 180 degrees and reading of image data after rotation by referring to the conceptional diagrams of change of storage state in the image memory 1 shown in FIGS. 19 and 20. As in the case of the rotation by 90 degrees above, the original image data has a size of n pixels×n lines, with k=4.

First, the processes for reading the image data of the 2j-th (j=0, 1, 2, . . . ) page after rotation and writing of the original image data of the (2j+1)-th page are performed according to procedure 1 shown in FIG. 11 by specifying address 00 indicated in <READ> in FIG. 19 to read corresponding 16 pixels, selecting pixels FF, FE, FD and FC among them stored in areas 0–3 to constitute the first line of the image data of the 2j-th page after rotation, and then writing pixels 00–03 on the first line of the original image data of the (2j+1)-th page in the same areas at the same address. Thereafter, also according to procedure 1, writing is performed in each locations enclosed in a block in the direction from the top to the bottom in <WRITE> in FIG. 19 after reading of pixels from the same address every four pixels, and selection of four pixels in the same areas. In this case, the read image data of the 0-th page after rotation is not output from the output device 4 under the same reason described for reading of the image data of the 0-th page after rotation in the rotation by 90 degrees.

Then, reading of the image data of the (2j+1)-th page after rotation and writing of the original image data of the (2j+2)-th page are performed according to procedure 3 shown in FIG. 15 by specifying address 0F in the top row of <READ> in FIG. 20 to read 16 corresponding pixels, selecting pixels FF, FE, FD and FC stored in the areas F, E, C and D among them to constitute the first line of the image data of the (2j+1)-th page after rotation, and then writing pixels 00–03 on the first line of the original image data of the (2j+2)-th page in the same areas at the same address in the locations enclosed in the block at the top of <WRITE> in FIG. 20. Thereafter, also according to procedure 3, writing is performed in each locations enclosed in a block in the direction from the top to the bottom in <WRITE> in FIG. 20 after reading of pixels from the same address every four pixels, and selection of four pixels in the same areas.

The storage state of the image data of the (2j+2)-th page in the image memory 1 by procedure 3 just described is same as that of the image data of the 2j-th page read from the image memory 1 by procedure 1 as indicated by <WRITE> in FIG. 20 and <READ> in FIG. 19.

For example, pixels stored in all areas at the bottom address 00 in <WRITE> in FIG. 20 are same as pixels stored in all areas at address 00, the top address, in <READ> in FIG. 9. Therefore, reading of image data of the (2j+2)-th page after rotation is performed according to procedure 1 shown in FIG. 11.

(6) Then, there is described the processes for writing the original image data in the rotation by 270 degrees and reading of the image data after rotation by referring to the conceptional diagrams of change of storage state in the image memory 1 shown in FIGS. 21 through 24. As in the case of the rotation by 90 degrees above, the original image data has a size of n pixels×n lines, with k=4.

Figure 21:
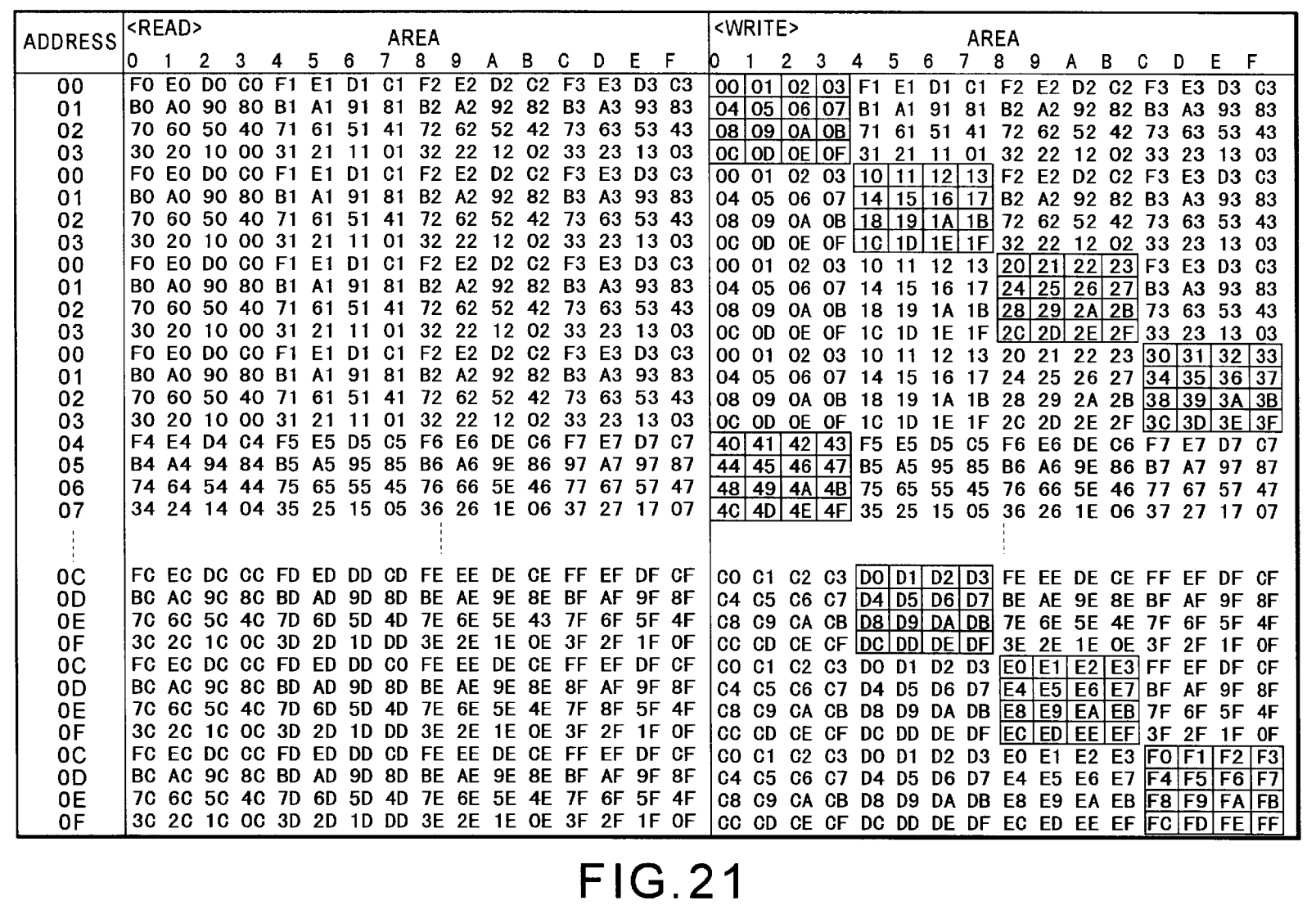

First, the processes for reading the image data of the 4j-th (j=0, 1, 2, . . . ) page after rotation and writing of the original image data of the (4j+1)-th page are performed according to procedure 1 shown in FIG. 11 by specifying address 00 indicated in <READ> in FIG. 21 to read corresponding 16 pixels, selecting pixels F0, E0, D0 and C0 among them stored in areas 0–3 to constitute the first line of the image data of the 4j-th page after rotation, and then writing pixels 00–03 on the first line of the original image data of the (4j+1)-th page in the same areas at the same address. Thereafter, also according to procedure 1, writing is performed in each locations enclosed in a block in the direction from the top to the bottom in <WRITE> in FIG. 21 after reading of pixels from the same address every four pixels, and selection of four pixels in the same areas. In this case, the read image data of the 0-th page after rotation is not output from the output device 4 under the same reason described for reading of the image data of the 0-th page after rotation in the rotation by 90 degrees.

Figure 22:
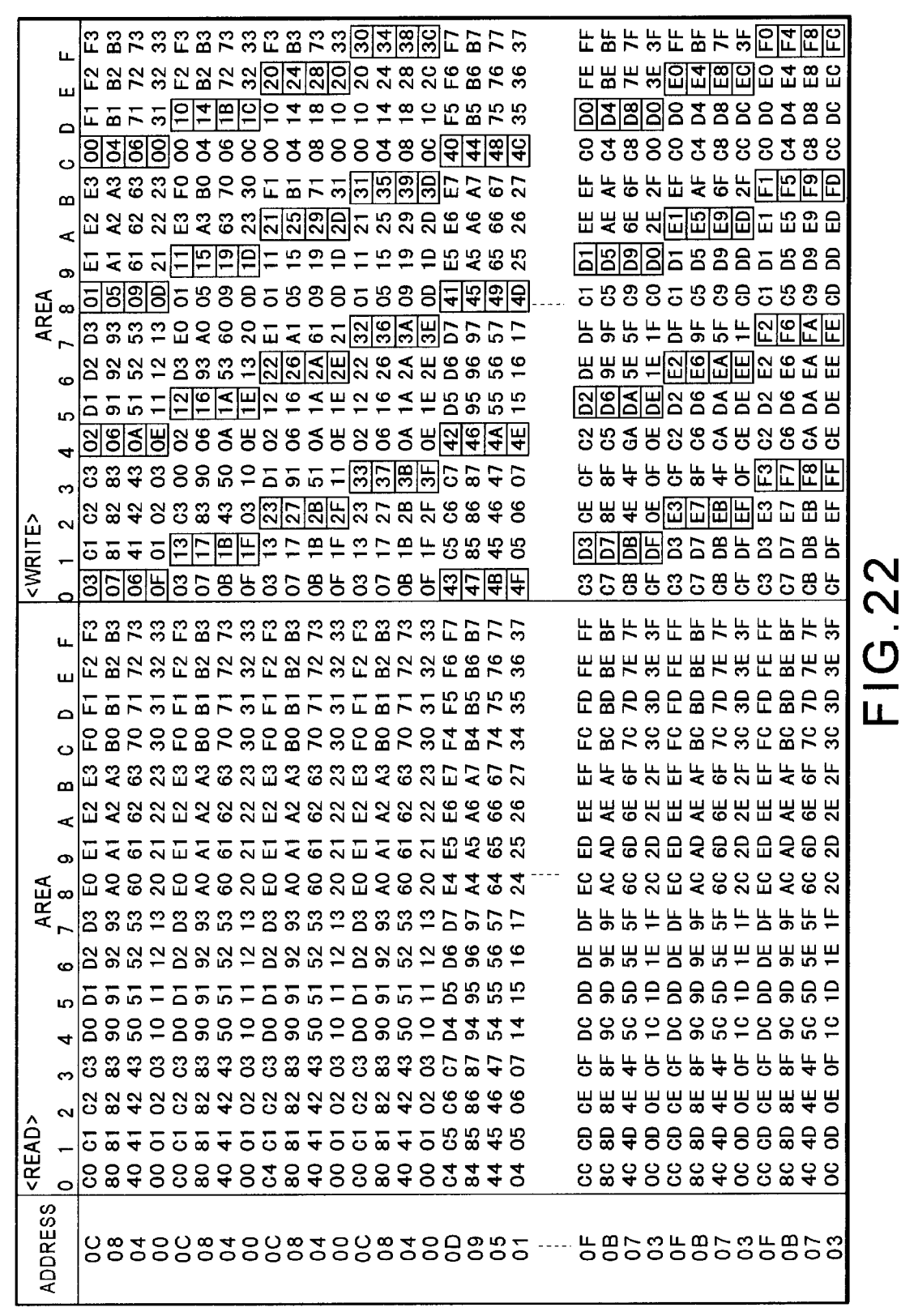

Then, reading of the image data of the (4j+1)-th page after rotation and writing of the original image data of the (4j+2)-th page are performed according to procedure 4 shown in FIG. 17 by specifying address 0C in the top row of <READ> in FIG. 22 to read 16 corresponding pixels, selecting pixels F0, E0, D0 and C0 stored in the areas C, 8, 4 and 0 among them to constitute the first line of the image data of the (4j+1)-th page after rotation, and then writing pixels 00–03 on the first line of the original image data of the (4j+2)-th page in the same areas at the same address in the locations enclosed in the block at the top of <WRITE> in FIG. 22. Thereafter, also according to procedure 4, writing is performed in each locations enclosed in a block in the direction from the top to the bottom in <WRITE> in FIG. 22 after reading of pixels from the same address every four pixels, and selection of four pixels in the same areas.

Figure 23:
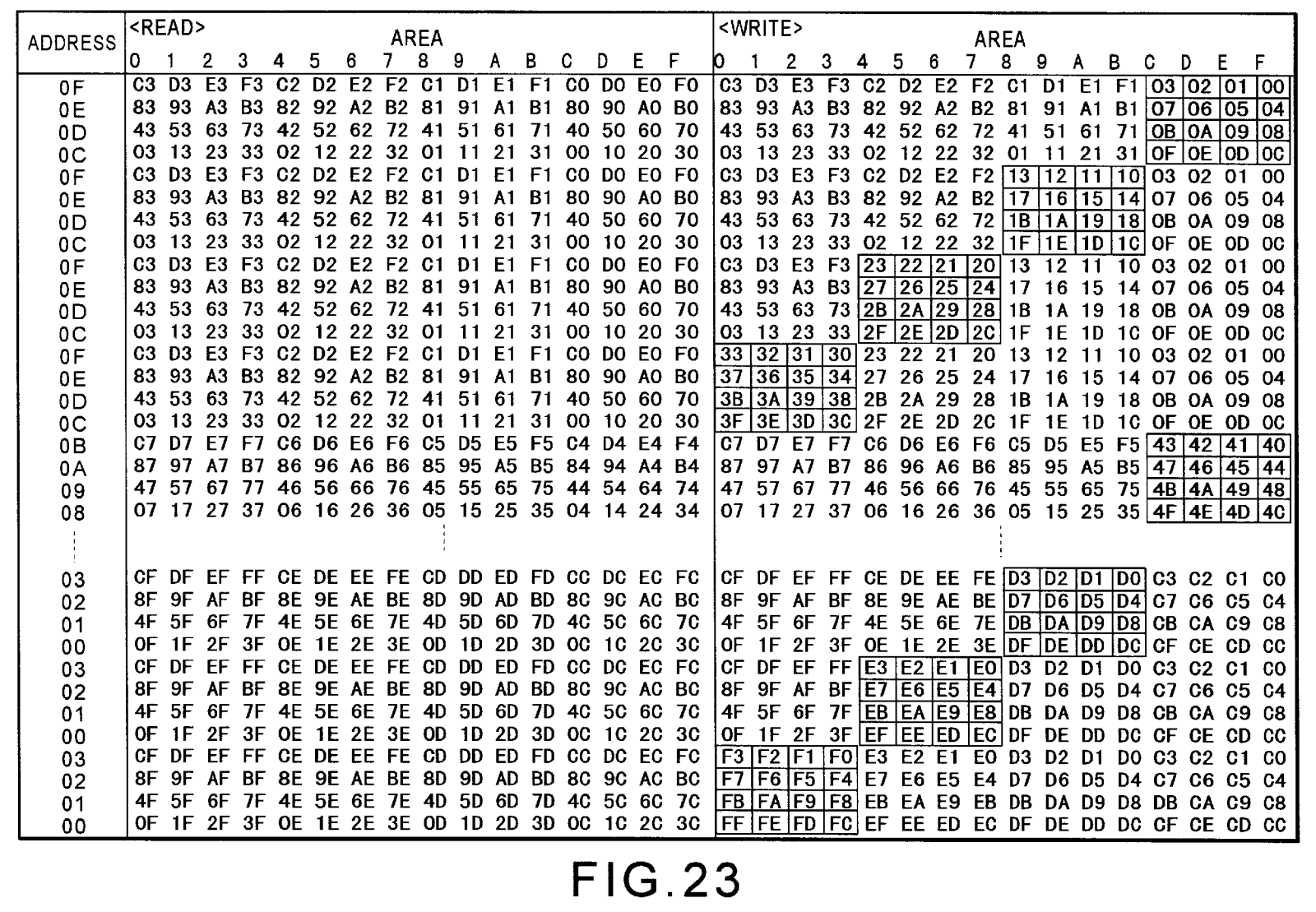

Furthermore, the processes for reading the image data of the (4j+2)-th page after rotation and writing the original image data of the (4j+3)-th page are performed according to procedure 3 shown in FIG. 15 by specifying address 0F in <READ> in FIG. 23 to read 16 corresponding pixels, selecting pixels F0, E0, D0 and C0 stored in the areas F, E, D and C among them to constitute the first line of the image data of the (4j+2)-th page after rotation, and then writing pixels 00–03 on the first line of the original image data of the (4j+3)-th page in the same areas at the same address in the locations enclosed in the block at the top of <WRITE> in FIG. 23. Thereafter, also according to procedure 3, writing is performed in each locations enclosed in a block in the direction from the top to the bottom in <WRITE> in FIG. 23 after reading of pixels from the same address every four pixels, and selection of four pixels in the same areas.

Figure 24:
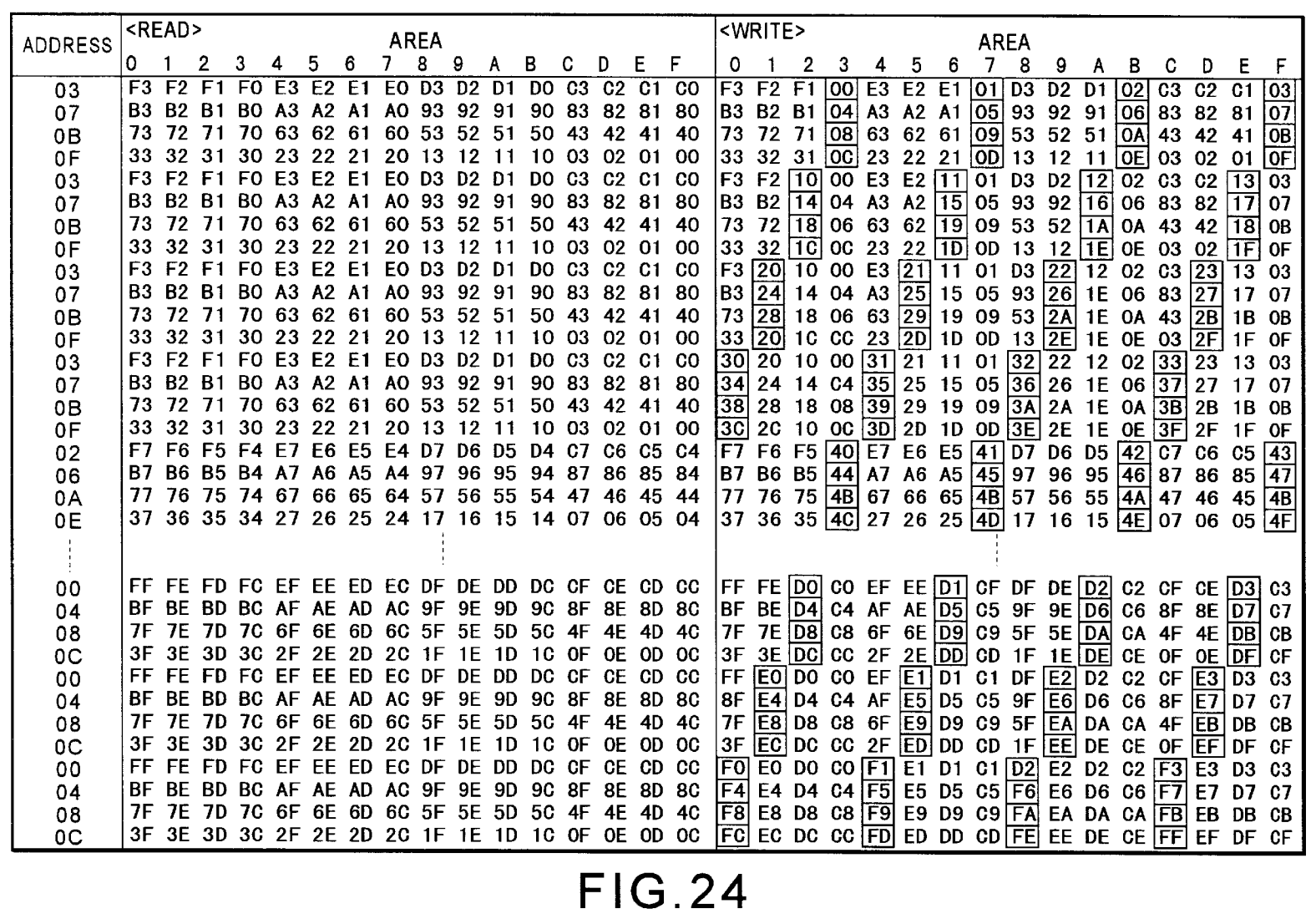

Then, reading of the image data of the (4j+3)-th page after rotation and writing of the original image data of the (4j+4)-th page are performed according to procedure 2 shown in FIG. 13 by specifying address 03 in the top row of <READ> in FIG. 24 to read 16 corresponding pixels, selecting pixels F0, E0, D0 and C0 stored in the areas 3, 7, B and F among them to constitute the first line of the image data of the (4j+3)-th page after rotation, and then writing pixels 00–03 on the first line of the original image data of the (4j+4)-th page in the same areas at the same address in the locations enclosed in the block at the top of <WRITE> in FIG. 24. Thereafter, also according to procedure 2, writing is performed in each locations enclosed in a block in the direction from the top to the bottom in <WRITE> in FIG. 24 after reading of pixels from the same address every four pixels, and selection of four pixels in the same areas.

The storage state of the image data of the (4j+4)-th page in the image memory 1 by procedure 2 just described is same as that of the image data of the 4j-th page read from the image memory 1 by procedure 1 as indicated by <WRITE> in FIG. 24 and <READ> in FIG. 21. For example, pixels stored in all areas at the bottom address 0C in <WRITE> in FIG. 24 are same as pixels stored in all areas at address 0C in <READ> in FIG. 19. Therefore, reading of the image data of the (4j+4)-th page after rotation is performed according to procedure 1 shown in FIG. 11.

Figures 25, 26:
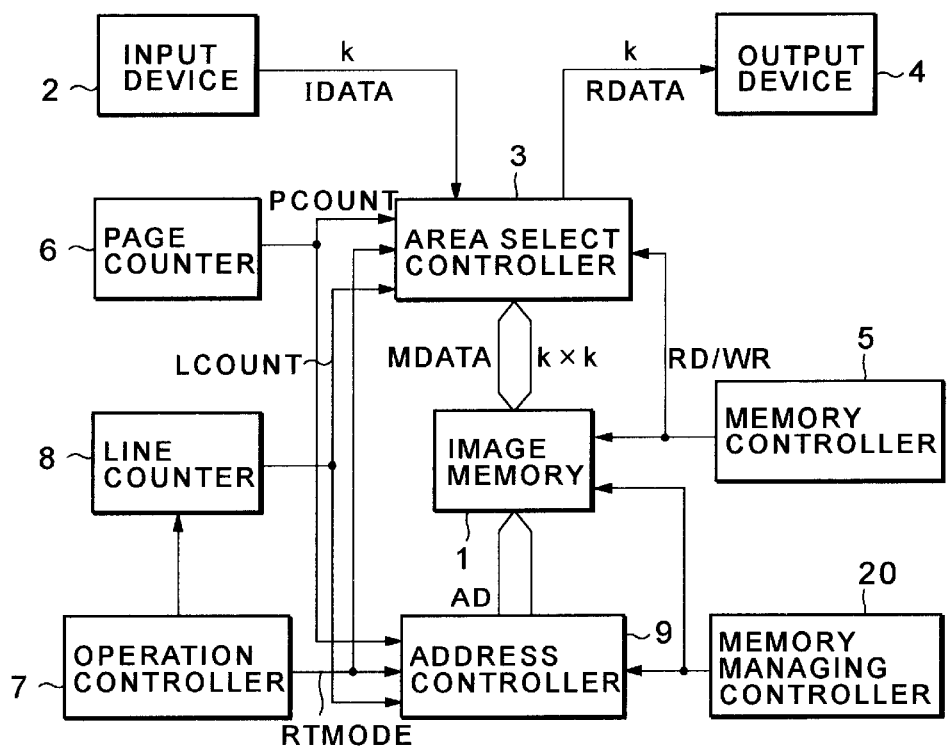
FIG. 25 is a diagram showing a relationship between a combination of procedure 1–procedure 4 and rotation angles of original image data.
FIG. 26 is a block diagram showing an electrical arrangement of an image data rotating apparatus which is a second embodiment of the present invention.

Here, FIG. 25 shows the relationship between the combination of procedures 1–4 and the rotation angle of the original image data. In the rotation by 90 degrees, the first to fourth pages are processed according to procedures 1–4, respectively, and the fifth page and thereafter are processed according to the order just described by four pages, whereby the original data can be rotated by 90 degrees and recorded on the recording paper regardless of the number of pages.

In addition, in the rotation by 180 degrees, the first and second pages are processed according to procedures 1 and 3, respectively, and the third page and thereafter are processed according to the order just described by two pages, whereby the original image data can be rotated by 180 degrees and recorded on the recording paper regardless of the number of pages. Furthermore, in the rotation by 270 degrees, the first through fourth pages are processed according to procedures 1, 4, 3 and 2, respectively, and the fifth page and thereafter are processed according to the order just described by four pages, whereby the original image data can be rotated by 270 degrees and recorded on the recording paper regardless of the number of pages.

As described, according to the arrangement of the embodiment, since, when the image data of the first page after rotation is read, the original image data of the second page is arranged to be written at the same areas at the same address of the image memory 1, the image memory 1 is sufficient to have a memory capacity of the squared number of the larger of the number of pixels per line of the original image data or the number of lines (memory capacity capable of storing image data of 297 mm×297 mm in the case of A4 size (210 mm×297 mm)), and the time for rotation can be shortened than the conventional arrangement. In addition, in the case of rotation by 180 degrees, the memory capacity of the image memory 1 is sufficient to be for one page.

B. Second Embodiment

Now, the second embodiment is described, FIG. 26 is a block diagram showing an arrangement of an image data rotating apparatus which is the second embodiment of the present invention. In the figure, components corresponding to those in FIG. 1 are denoted by like reference, and description is omitted for them.

The image data rotating apparatus shown in the figure is additionally provided with memory managing controller 20. The memory managing controller 20 secures a memory capacity necessary for rotating image data out of the entire memory capacity of the image memory 1, and transfers its top address to the address controller 9. The address controller 9 adds this top address to the result of addition of the adder 12 shown in FIG. 4, that is, the value stored as the address data AD in the first embodiment described above, and supplies it to the image memory 1 as address data AD.

Therefore, if the memory managing controller 20 is arranged only to assure the minimum memory capacity necessary for the rotation of image data out of the memory capacity of the image memory 1, remaining memory capacity of the image memory 1 not used for the rotation of image data can be used for other applications, so that the image memory 1 has a high use efficiency. The image data rotating apparatus of the second embodiment has the same arrangement and operation as the first embodiment described above, except for the memory managing controller 20 newly provided.

Figure 27:
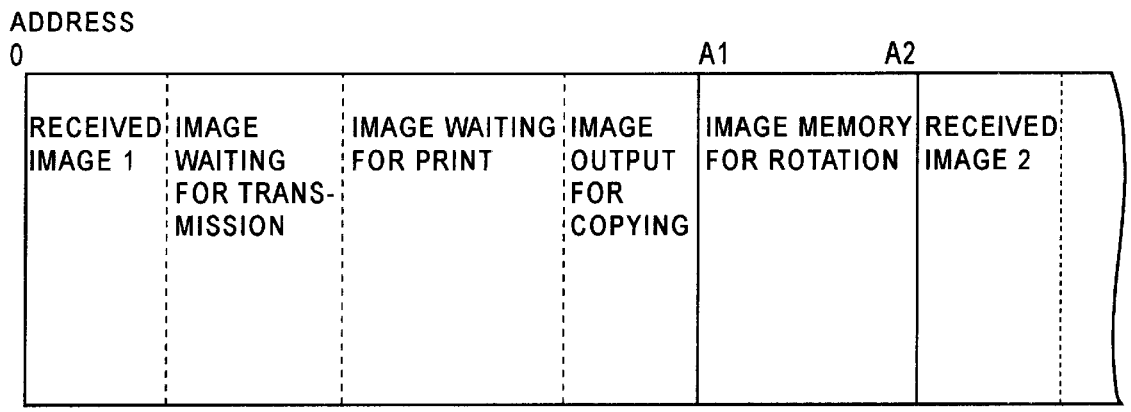
FIG. 27 is a conceptional diagram showing an example of use of the entire memory region of the image memory in the second embodiment of the present invention.

FIG. 27 shows a conceptional diagram showing an example of how to use the entire memory region of the image memory 1. The example shown in the figure is a one in which the image data rotating apparatus according to this embodiment is mounted on an image output device which can be used not only as a facsimile device but also as a copying machine or a printer. In the image memory 1 shown in FIG. 27, the region used for rotating the image data is assured between addresses A1–A2, and other memory region stores image data received but not yet recorded on recording paper, image data read by an image reader for transmission but not yet transmitted, image data transferred from a personal computer or the like but not yet recorded on the recording paper, or image data read by an image reader for copying but not yet recorded on recording paper.

As described, according to the arrangement of the example, there is no need to mount an image memory dedicated for rotation of the image data. In addition, while the size of image data to be rotated depends on the size of original image data, the above arrangement does not need to assure any time the assumed maximum memory capacity of the image memory for rotation (for example, memory capacity sufficient for writing image data of A3 size), and it is sufficient to assure a minimum memory capacity necessary for rotation every time it becomes required. Therefore, the image memory can be effectively utilized.

C. Third Embodiment

Figure 28:
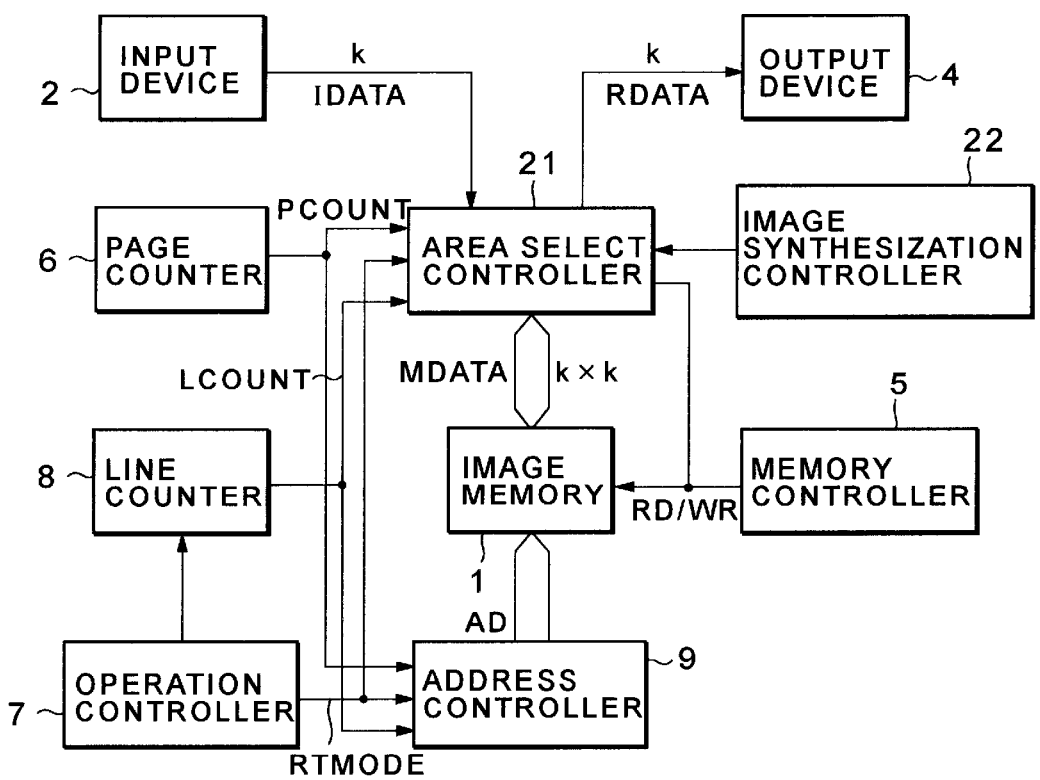
FIG. 28 is a block diagram showing an electrical arrangement of an image data rotating apparatus which is a third embodiment of the present invention.

Now, the third embodiment is described, FIG. 28 is a block diagram showing an arrangement of an image data rotating apparatus which is the third embodiment of the present invention. In the figure, components corresponding to those in FIG. 1 are denoted by like reference, and description is omitted for them.

The image data rotating apparatus shown in the figure is provided with area select controller 21 in place of the area select controller 3, and new image synthesization controller 22. In the area select controller 21, although not shown, each selector corresponding to each selector 13–16 in the area select controller 3 of the first embodiment (see FIG. 5) has, in addition to the functions described above, a function for performing logical operations such as logical product, logical sum or exclusive logical sum on the basis of synthesization control signal supplied by image synthesization controller 22 on four pixels selected on the basis of the select signals MSEL1–MSEL4, and for constituting selected input image data IDATA and on four pixels constituting the image data MDATA, and supplying the result to the read/write switch circuit 17. The image synthesization controller 22 generates a synthesization control signal corresponding to the logical operation indicated, for example, through operation of the input device (not shown) by an operator, and supplies to the area select controller 21. For example, taking logical sum as an example, when logical sum of two pixels is performed assuming black data of each pixel as "1" and white data as "0", an image overlapping them is generated, so that, when the operator instructs the logical sum, he/she can record on recording paper an image in which image data read from the image memory 1 is overlapped on input image data. Here, the image data rotating apparatus according to the third embodiment has the same arrangement and operation as the first embodiment, except for that the area select controller 21 is provided in place of the area select controller 3, and the image synthesization controller 22 is newly provided.

As described, with such arrangement, there is no need to mount a circuit and an image memory dedicated for image data synthesization.

D. Fourth Embodiment

Now, the fourth embodiment is described, Although the angle for rotation of original image data is fixed to one angle in each embodiment described above, the rotation angle of image data is appropriately changed for each page in the fourth embodiment. Such operation is performed under the following reason.

That is, in recording image data on both surfaces of recording paper cut into a predetermined size, if a conveyor mechanism for conveying the recording paper conveys the recording paper in a direction parallel to the sub-scanning direction (line direction) of the conveyor mechanism in recording the image data on the recording paper, usually, it is often performed that, after recording the image data of a page on the surface of one sheet of recording paper, the recording paper is reversed in a direction parallel to its conveying direction to record the image data of the next page on the back surface of the recording paper. In such case, if the image data for such two pages is recorded on the surface and the back surface of the recording paper in the same rotation angle, the image data is recorded upside down or reversed in the lateral direction on the surface and the back surface of a sheet of recording paper. In addition, since the facsimile device or personal computer supplying the image data does not have a function for rotating the image data, if the input image data is recorded on the recording paper as is, the recording result may not be in a form easy for view. To solve such inconvenience, the rotation angle for image data is appropriately changed for each page.

In the fourth embodiment, the image data rotating apparatus has the same arrangement and operation as the first embodiment, except for that it has the function described above.

(1) First, there is described a case repeating a process where image data of a page is not rotated, but that of the next page is rotated by 180 degrees with reference to a control procedure shown in FIG. 29.

First, the original image data of the first page to be recorded on the surface of the first sheet of recording paper is written in the image memory 1 based on procedure 1 shown in FIG. 11. In this case, while the image data of the 0-th page after rotation is also read, the read image data is not output under the same reason described as above, so that nothing is recorded on the recording paper. Then, the image data of the first page is read from the image memory 1 also based on procedure 1 shown in FIG. 11, and the original image data of the second page to be recorded on the back surface of the first sheet of recording paper is written in the image memory 1. As such, since the image data of the first page is written in the image memory 1 according to procedure 1, and read in the same procedure 1, the original image data of the first page is recorded on the surface of the first sheet of recording paper as it is. Then, the image data of the second page is read from the image memory 1 based on procedure 3 shown in FIG. 15, and the original image data of the third page to be recorded on the surface of the second sheet of recording paper is written in the image memory 1. As such, since the image data of the second page is written in the image memory 1 according to procedure 1, and read in different procedure 3, the image data of the second page is recorded on the back surface of the first sheet of recording paper with rotation by 180 degrees. Then, the image data of the third page is read from the image memory 1 also based on procedure 3 shown in FIG. 15, and the original image data of the fourth page to be recorded on the back surface of the second sheet of recording paper is written in the image memory 1. As such, since the image data of the third page is written in the image memory 1 according to procedure 3, and read in the same procedure 3, the original image data of the third page is recorded on the surface of the second sheet of recording paper as it is.

In addition, the image data of the fourth page is read from the image memory 1 based on procedure 1, and the original image data of the fifth page to be recorded on the surface of the third sheet of recording paper is written in the image memory 1. As such, since the image data of the fourth page is written in the image memory 1 according to procedure 3, and read in different procedure 1, the image data of the fourth page is recorded on back the surface of the second sheet of recording paper with rotation by 180 degrees.

The image data not rotated and the image data rotated by 180 degrees are alternately output by repeating the process described above for the image data of the sixth page and thereafter, In this case, the processing time can be shortened since writing of the image data for one page in the image memory 1 is simultaneously performed as reading of the image data for one page from the image memory 1.

(2) Then, there is described a case where image data of a page is rotated by 90 degrees, and that of the next page is rotated by 270 degrees with reference to a control procedure shown in FIG. 30.

First, the original image data of the first page to be recorded on the surface of the first sheet of recording paper is written in the image memory 1 based on procedure 1 shown in FIG. 11. In this case, wile the image data of the 0-th page after rotation is also read, the read image data is not output under the same reason described as above, so that nothing is recorded on the recording paper. Then, the image data of the first page is read from the image memory 1 based on procedure 2 shown in FIG. 13, and the original image data of the second page to be recorded on the back surface of the first sheet of recording paper is written in the image memory 1. As such, since the image data of the first page is written in the image memory 1 according to procedure 1, and read in different procedure 2, the image data of the first page is recorded on the surface of the first sheet of recording paper with rotation by 90 degrees.

Then, the image data of the second page is read from the image memory 1 based on procedure 1, and the original image data of the third page to be recorded on the surface of the second sheet of recording paper is written in the image memory 1. As such, since the image data of the second page is written in the image memory 1 according to procedure 2, and read in different procedure 1, the image data of the second page is recorded on the back surface of the first sheet of recording paper with rotation by 270 degrees. Then, the image data of the third page is read from the image memory 1 based on procedure 2, and the original image data of the fourth page to be recorded on the back surface of the second sheet of recording paper is written in the image memory 1. As such, since the image data of the third page is written in the image memory 1 according to procedure 1, and read in different procedure 2, the original image data of the third page is recorded on the surface of the second sheet of recording paper with rotation by 90 degrees.

In addition, the image data of the fourth page is read from the image memory 1 based on procedure 1, and the original image data of the fifth page to be recorded on the surface of the third sheet of recording paper is written in the image memory 1. As such, since the image data of the fourth page is written in the image memory 1 according to procedure 2, and read in different procedure 1, the image data of the fourth page is recorded on the back surface of the second sheet of recording paper with rotation by 270 degrees.

The image data rotated by 90 degrees and the image data rotated by 270 degrees are alternately output by repeating the process described above for the image data of the sixth page and thereafter, In this case, the processing time can be shortened since writing of the image data for one page in the image memory 1 is simultaneously performed as reading of the image data for one page from the image memory 1.

Figures 31, 32:
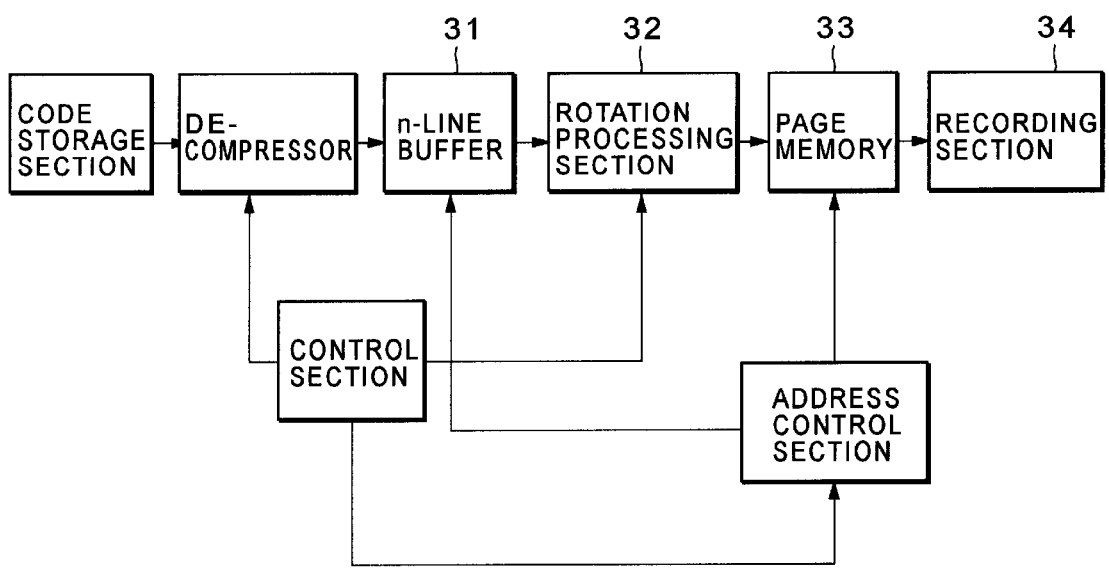
FIG. 31 is a control procedure showing a combination of procedures when image data is repeatedly rotated and rotated by 270 degrees and 90 degrees every one other page in the fourth embodiment of the present invention.
FIG. 32 is a block diagram showing an example of electrical arrangement of a conventional image data rotating apparatus.

(3) Then, there is described a case repeating a process where image data of a page is rotated by 270 degrees, and that of the next page is rotated by 90 degrees with reference to a control procedure shown in FIG. 31.

First, the original image data of the first page to be recorded on the surface of the first sheet of recording paper is written in the image memory 1 based on procedure 1 shown in FIG. 11. In this case, while the image data of the 0-th page after rotation is also read, the read image data is not output under the same reason described as above, so that nothing is recorded on the recording paper. Then, the image data of the first page is read from the image memory 1 based on procedure 4 shown in FIG. 17, and the original image data of the second page to be recorded on the back surface of the first sheet of recording paper is written in the image memory 1. As such, since the image data of the first page is written in the image memory 1 according to procedure 1, and read in different procedure 4, the image data of the first page is recorded on the surface of the first sheet of recording paper with rotation by 270 degrees.

Then, the image data of the second page is read from the image memory 1 based on procedure 1, and the original image data of the third page to be recorded on the surface of the second sheet of recording paper is written in the image memory 1. As such, since the image data of the second page is written in the image memory 1 according to procedure 4, and read in different procedure 1, the image data of the second page is recorded on the back surface of the first sheet of recording paper with rotation by 90 degrees. Then, the image data of the third page is read from the image memory 1 based on procedure 4, and the original image data of the fourth page to be recorded on the back surface of the second sheet of recording paper is written in the image memory 1. As such, since the image data of the third page is written in the image memory 1 according to procedure 1, and read in different procedure 4, the original image data of the third page is recorded on the surface of the second sheet of recording paper with rotation by 270 degrees.

In addition, the image data of the fourth page is read from the image memory 1 based on procedure 1, and the original image data of the fifth page to be recorded on the surface of the third sheet of recording paper is written in the image memory 1. As such, since the image data of the fourth page is written in the image memory 1 according to procedure 4, and read in different procedure 1, the image data of the fourth page is recorded on the back surface of the second sheet of recording paper with rotation by 90 degrees.

The image data rotated by 90 degrees and the image data rotated by 270 degrees are alternately output by repeating the process described above for the image data of the sixth page and thereafter. In this case, the processing time can be shortened since writing of the image data for one page in the image memory 1 is simultaneously performed as reading of the image data for one page from the image memory 1.

E. Fifth Embodiment

Now, the fifth embodiment is described, Although, in each embodiment described above, the angle for rotating the original image data is initially and previously set, this embodiment appropriately changes the rotation angle of the image data for each page to accommodate a situation arising during rotation of original image data. Such operation is performed under the following reason.

That is, as described in the Summary of the Invention, it is assumed, for example, that, if original image data with its vertical direction in the longitudinal direction of A4 size is received as recording paper with the width of the longitudinal dimension of A4 size (297 mm) is loaded on the facsimile device. Then, since it cannot be recorded on recording paper as is, the facsimile device senses such situation, and records the original image data on the recording paper after rotating it by 90 degrees. Under such circumstances, if the recording paper which has been loaded on the device exhausts, and the operator detects the recording conditions of image data output from the device, and newly loads recording paper with width of the lateral dimension of A4 size (210 mm, but actual width of recording paper being 216 mm) on the device, it is necessary to record the received original image data on the recording paper without rotation as it. Then, to accommodate such situation, the rotation angle for image data is appropriately changed for each page.

In the fifth embodiment, the image data rotating apparatus has the same arrangement and operation as that of the first embodiment, except for that it has the function described above.

An example is described in the following. First, the rotation of original image data by 90 degrees is performed in an order of procedure 1–procedure 2–procedure 3–procedure 4–procedure 1. In a situation where the rotation of image data is being performed in this order, for example, when the recording paper is changed from a one with the longitudinal dimension of A4 size (297 mm) to a one with the lateral dimension of A4 size (216 mm) after image data of a page is written in the image memory 1 in procedure 2, the image data cannot be read from the image memory 1 in the next procedure 3, but the image data is stored in the image memory in procedure 2.

Then, the device changes the procedure to be used next based on the type of changed recording paper and the procedure which was used before the recording paper is changed. In this case, since the changed recording paper has width of lateral dimension of A4 size (216 mm), and the image data is stored in the image memory 1 in procedure 2, the device changes the procedure to be used next from the previous procedure 3 to procedure 2, reads the image data stored in the image memory 1 at present with procedure 2, and reads and writes image data of the next page and thereafter. That is, it is controlled not to rotate the image data.

With such arrangement, since there is no need to perform a process for returning the rotated image data to the image data before the rotation, or a process for reading the original image data as in the prior art, it is possible to shorten the time for recording the image data on the recording paper.

While the embodiments of the present invention have been described in detail with reference to the drawings, the specific arrangement is not limited to these embodiments, and the present invention includes design changes within a range not departing the spirit of the present invention.

For example, although the embodiments transfer the image data in parallel between the input 2 and the output device 4, and the area select controller 3, it is not limited to such arrangement. For example, the input device 2 may be arranged to have a serial/parallel converter circuit, a circuit for converting data with more pixels to data by k pixels, a circuit for decoding coded data, a circuit for generating data timing, or a combination thereof. On the other hand, the output device 4 may be arranged, for example, to have a parallel/serial converter circuit, a circuit for converting data consisting of k pixels into data with more pixels, a coding circuit, a circuit for generating data timing, or a combination thereof.

In addition, although the first embodiment is arranged such that image data of the 0-th page is not output from the output device 4 even if it is read when image data of the first page is written, it may be arranged such that all content of storage in the image memory 1 are erased before rotation is performed. With such arrangement, nothing is recorded on the recording paper even if the image data of the 0-th page is arranged to be read and output from the output device 4.

Furthermore, although all the embodiments is arranged to perform rotation when image data is read from the image memory 1, they are not limited to such arrangement. The rotation may be performed when image data is written in the image memory 1, or performed in both reading and writing. In this case, it is possible to perform the process for reading image data from the image memory 1 and the process for writing the image data in the image memory 1 at different times, so that there is no need to simultaneously access the same address of the image memory 1 in the process for reading image data and the process for writing image data. Therefore, the storage capacity of the image memory 1 is sufficient to be for one page.

As described above, according to the arrangement of the present invention, since it is arranged in reading rotated image data of a page, to write image data of the next page in the same area at the same address of the image data, it is possible to reduce the amount of memory used for rotating the image data, and to shorten the processing time. That is, the apparatus can be inexpensively constructed because an image memory or line buffer dedicated for rotation as used conventionally becomes unnecessary. In addition, rotation for image data of the second page and thereafter can be performed at a speed similar to the case where the image data is simply once written and read in and from the image memory without the rotation.

In addition, according to the present invention, since the minimum memory capacity necessary for rotation is assured every time, the image memory used for the rotation of image data can be used for other applications, and, if the rotation of image data is not performed, the region assured for that process in the image memory can also be utilized for other applications. Therefore, the image memory can be effectively utilized.

In addition, according to another arrangement of the present invention, since synthesization of image data is also performed when reading rotated image data of a page and writing image data of the next page, it becomes unnecessary to have a circuit or image memory dedicated for synthesization of image data, and the processing time can be shortened.

Furthermore, according to another arrangement of the present invention, since reading of image data from the image data and writing of image data in the image memory are performed every one other page, even if it is need to, during rotation of image data, stop the rotation of the image data after the image data is stored in the image memory, or to change the rotation angle, the angle of rotation of image data can be appropriately changed, so that such situation can be accommodated.

What is claimed is:

1. An image data rotating method comprising the steps of:
using an image memory capable of storing pixels in same number as square of a maximum number among number of pixels per one line of each of image data with a plurality of sizes to be rotated and number of lines to be rotated;

number of pixels and number of lines in the same number as one of common divisors of said number of pixels per line and said number of lines being unit number of pixels and unit number of lines in the process writing or reading said image data in or from said image memory;

for consecutive two pages in image data with the same size of a plurality of pages to be rotated, reading all pixels of image data in a former page written in said image memory from each storage area at each address of said image memory in a predetermined order of reading according to an angle to be rotated by said unit number of pixels for one line and by said unit number of lines for all lines; and writing all pixels of image data in the latter page in the same storage area at the same address of said image memory in said predetermined order by said unit number of pixels for one line and by said unit number of lines for all lines.

2. The image data rotating method according to claim 1, wherein, before said pixels are written, image synthesization is performed for pixels read from the same storage area at the same address of said image memory and pixels to be written, said synthesized image being written in said same storage area at said same address of said image memory.

3. The image data rotating method according to claim 2, wherein, after image data of a page is written in said image memory in a predetermined procedure, if said image data cannot be read and output outside in a procedure different from said predetermined procedure, but can be read and output outside in said predetermined procedure, it is read in said predetermined procedure.

4. The image data rotating method according to claim 1, wherein, after image data of a page is written in said image memory in a predetermined procedure, if said image data cannot be read and output outside in a procedure different from said predetermined procedure, but can be read and output outside in said predetermined procedure, it is read in said predetermined procedure.

5. An image data rotating method comprising a first step comprising the steps of:

using an image memory capable of storing pixels in same number as square of a maximum number among number of pixels per one line of each of image data with a plurality of sizes to be rotated and number of lines to be rotated;

number of pixels and number of lines in the same number as one of common divisors of said number of pixels per line and said number of lines being unit number of pixels and unit number of lines in the process writing or reading said image memory; and for image data with the same size of a plurality of pages to be rotated, sequentially writing all pixels of image data of the first page in said image memory from the first storage area at the first address to an address and storage area corresponding to said size by said unit number of pixels for one line and by said unit number of lines for all lines; or writing in each storage area at each address of said image memory in a predetermined order of writing according to an angle to be rotated by said unit number;

a second process comprising the steps of: for image data of consecutive two pages, reading all pixels of image data in a former page written in said image memory from each storage area at each address of said image memory in a predetermined order of reading according to the same angle as the above angle or at a different angle to be rotated by said unit number of pixels for one line and by said unit number of lines for all lines; and writing all pixels of image data in the latter page in the same storage area at the same address of said image memory in said predetermined order by said unit number of pixels for one line and by said unit number of lines for all lines.

6. The image data rotating method according to claim 5, wherein, before said pixels are written, image synthesization is performed for pixels read from the same storage area at the same address of said image memory and pixels to be written, said synthesized image being written in said same storage area st said same address of said image memory.

7. The image data rotating method according to claim 5, wherein, after image data of a page is written in said image memory in a predetermined procedure, if said image data cannot be read and output outside in a procedure different from said predetermined procedure, but can be read and output outside in said predetermined procedure, it is read in said predetermined procedure.

8. An image data rotating method comprising a first process comprising the steps of:

using an image memory capable of storing pixels in the same number as the squared maximum number of the number of pixels per line of each of image data with a plurality of sizes to be rotated $m_1, m_2, m_3, \ldots$ (m being a positive integer, the subscript indicating that size is different) and the number of lines $n_1, n_2, n_3, \ldots$ (n being a positive integer, the subscript indicating that size is different and corresponds to $m_1, m_2, m_3, \ldots$);

k pixels and k lines in the same number as one of common divisors k of said number of pixels per line $m_1, m_2, m_3, \ldots$ and said number of lines $n_1, n_2, n_3, \ldots$ (k being a positive integer) being unit number of pixels and unit number of lines in the process writing or reading said image memory;

for image data of a plurality of pages with the same size to be rotated by 90 degrees, selecting k pixels out of $k^2$ pixels, which are read by specifying by n/k all pixels in image data of the 4j-th (j=0, 1, 2, ...) page stored in said image memory from the first address of addresses of said image memory, from storage areas (i−1+L×k) in said address (i being a variable indicating the order of pixels to be read, i=1, 2, ..., k, L being a variable indicating the order of lines in a line group consisting of k lines which constitute the rotated image data, L=1, 2, ..., k); and writing all pixels of image data at (4j+1)-th page to be rotated every k pixels in the specified storage area at the same address of said image memory in which the selected k pixels are stored;

said writing step being repeated until said value of L exceeds k by updating the address by one every time the processes for reading and writing k pixels are completed, and returning said address to said first address every time the process is completed for one line;

a second process comprising the steps of: selecting k pixels out of $k^2$ pixels, which are read by specifying by one all pixels in image data of the (4j+1)-th page stored in said image memory from the (n/k−1)-th address of addresses of said image memory to the first address, from storage areas (i×k−L−1) in said address; and writing all pixels of image data at (4j+2)-th page to be rotated every k pixels in k storage areas at the same address of said specified image memory;

said writing step being repeated until said value of L exceeds k by updating by n/k the address every time the processes for reading and writing k pixels are completed, and returning said address to said first address every time the process is completed for one line;

a third process comprising the steps of: selecting k pixels out of $k^2$ pixels, which are read by specifying by n/k all pixels in image data of the (4j+2)-th page stored in said image memory from the $(n^2/k^2-1)$-th address of addresses of said image memory to the first address, from storage areas $\{(k-L) \times k-i\}$ in said address; and writing all pixels of image data at (4j+3)-th page to be rotated every k pixels in k storage areas at the same address of said specified image memory;

said writing step being repeated until said value of L exceeds k by reducing the address by one every time the processes for reading and writing k pixels are completed, and returning said address to said first address every time the process is completed for one line; and a fourth process comprising the steps of: selecting k pixels out of $k^2$ pixels, which are read by specifying by one all pixels in image data of the (4j+3)-th page stored in said image memory from the $\{n \times (n-k)/k^2\}$-th address of addresses of said image memory to the first address, from storage areas $\{(k-i) \times k+L\}$ in said address; and writing all pixels of image data at (4j+4)-th page to be rotated every k pixels in k storage areas at the same address of said specified image memory;

said writing step being repeated until said value of L exceeds k by reducing by n/k the address every time the processes for reading and writing k pixels are completed, and returning said address to said first address every time the process is completed for one line;

wherein said fourth process is followed by said first process, the read image data is not output in said first process if j=0.

9. The image data rotating method according to claim 8, wherein, before said pixels are written, image synthesization is performed for pixels read from the same storage area at the same address of said image memory and pixels to be written, said synthesized image being written in said same storage area st said same address of said image memory.

10. The image data rotating method according to claim 8, wherein, after image data of a page is written in said image memory in a predetermined procedure, if said image data cannot be read and output outside in a procedure different from said predetermined procedure, but can be read and output outside in said predetermined procedure, it is read in said predetermined procedure.

11. An image data rotating method comprising a first process comprising the steps of:

using an image memory capable of storing pixels in the same number as the squared maximum number of the number of pixels per line of each of image data with a plurality of sizes to be rotated $m_1, m_2, m_3, \ldots$ (m being a positive integer, the subscript indicating that size is different) and the number of lines $n_1, n_2, n_3, \ldots$ (n being a positive integer, the subscript indicating that size is different and corresponds to $m_1, m_2, m_3, \ldots$);

k pixels and k lines in the same number as one of common divisors k of said number of pixels per line $m_1, m_2, m_3, \ldots$ and said number of lines $n_1, n_2, n_3, \ldots$ (k being a positive integer) being unit number of pixels and unit number of lines in the process writing or reading said image memory;

for image data of a plurality of pages with the same size to be rotated by 180 degrees, selecting k pixels out of $k^2$ pixels, which are read by specifying by n/k all pixels in image data of the 2j-th (j=0, 1, 2, ...) page stored in said image memory from the first address of addresses of said image memory, from storage areas $(i-1+L \times k)$ in said address (i being a variable indicating the order of pixels to be read, i=1, 2, ..., k, L being a variable indicating the order of lines in a line group consisting of k lines which constitute the rotated image data, L=1, 2, ..., k); and writing all pixels of image data at (2j+1)-th page to be rotated every k pixels in storage areas at the same address of said specified image memory in which the selected k pixels are stored; and said writing step being repeated until said value of L exceeds k by updating the address by one every time the processes for reading and writing k pixels are completed, and returning said address to said first address every time the process is completed for one line;

a second process comprising the steps of: selecting k pixels out of $k^2$ pixels, which are read by specifying by n/k all pixels in image data of the (2j+1)-th page stored in said image memory from the $(n^2/k^2-1)$-th address of addresses of said image memory to the first address, from storage areas $\{(k-L) \times k-i\}$ in said address; and writing all pixels of image data at (2j+2)-th page to be rotated every k pixels in k storage areas at the same address of said specified image memory;

said writing step being repeated until said value of L exceeds k by reducing the address by one every time the processes for reading and writing k pixels are completed, and returning said address to said first address every time the process is completed for one line; and wherein said second process is followed by said first process, the read image data being not output in said first process if j=0.

12. The image data rotating method according to claim 11, wherein, before said pixels are written, image synthesization is performed for pixels read from the same storage area at the same address of said image memory and pixels to be written, said synthesized image being written in said same storage area st said same address of said image memory.

13. The image data rotating method according to claim 11, wherein, after image data of a page is written in said image memory in a predetermined procedure, if said image data cannot be read and output outside in a procedure different from said predetermined procedure, but can be read and output outside in said predetermined procedure, it is read in said predetermined procedure.

14. An image data rotating method comprising a first process comprising the steps of:

using an image memory capable of storing pixels in the same number as the squared maximum number of the number of pixels per line of each of image data with a plurality of sizes to be rotated $m_1, m_2, m_3, \ldots$ (m being a positive integer, the subscript indicating that size is different) and the number of lines $n_1, n_2, n_3, \ldots$ (n being a positive integer, the subscript indicating that size is different and corresponds to $m_1, m_2, m_3, \ldots$);

k pixels and k lines in the same number as one of common divisors k of said number of pixels per line $m_1, m_2$, $m_3, \ldots$ and said number of lines $n_1, n_2, n_3, \ldots$ (k being a positive integer) being unit number of pixels and unit number of lines in the processes writing and reading said image memory;

for image data of a plurality of pages with the same size to be rotated by 270 degrees, selecting k pixels out of $k^2$ pixels, which are read by specifying all pixels in image data of the 4j-th (j=0, 1, 2, ... ) page stored in said image memory by every n/k from the first address of addresses of said image memory, from storage areas (i−1+L×k) in said address (i being a variable indicating the order of pixels to be read, i=1, 2, ... , k, L being a variable indicating the order of lines in a line group consisting of k lines which constitute the rotated image data, L=1, 2, ... , k); and writing all pixels of image data at (4j+1)-th page to be rotated every k pixels in storage areas at the same address of said specified image memory in which the selected k pixels are stored;

said writing step being repeated until said value of L exceeds k by updating the address by one every time the processes for reading and writing k pixels are completed, and returning said address to said first address every time the process is completed for one line;

a second process comprising the steps of: selecting k pixels out of $k^2$ pixels, which are read by specifying by one all pixels in image data of the (4j+1)-th page stored in said image memory from the $\{n \times (n-k)/k^2\}$-th address of addresses of said image memory to the first address, from storage areas $\{(k-i) \times k+L\}$ in said address; and writing all pixels of image data at (4j+2)-th page to be rotated every k pixels in k storage areas at the same address of said specified image memory;

said writing step being repeated until said value of L exceeds k by reducing by n/k the address every time the processes for reading and writing k pixels are completed, and returning said address to said first address every time the process is completed for one line;

a third process comprising the steps of: selecting k pixels out of $k^2$ pixels, which are read by specifying by n/k all pixels in image data of the (4j+2)-th page stored in said image memory from the $(n^2/k^2-1)$-th address of addresses of said image memory to the first address, from storage areas $\{(k-L) \times k-i\}$ in said address; and writing all pixels of image data at (4j+3)-th page to be rotated every k pixels in k storage areas at the same address of said specified image memory;

said writing step being repeated until said value of L exceeds k by reducing the address by one every time the processes for reading and writing k pixels are completed, and returning said address to said first address every time the process is completed for one line; and a fourth process comprising the steps of: selecting k pixels out of $k^2$ pixels, which are read by specifying by one all pixels in image data of the (4j+3)-th page stored in said image memory from the (n/k−1)-th address of addresses of said image memory to the first address, from storage areas (i×k−L−1) in said address; and writing all pixels of image data at (4j+4)-th page to be rotated every k pixels in k storage areas at the same address of said specified image memory;

said writing step being repeated until said value of L exceeds k by updating by n/k the address every time the processes for reading and writing k pixels are completed, and returning said address to said first address every time the process is completed for one line;

wherein said fourth process is followed by said first process, the read image data is not output in said first process if j=0.

15. The image data rotating method according to claim 14, wherein, before said pixels are written, image synthesization is performed for pixels read from the same storage area at the same address of said image memory and pixels to be written, said synthesized image being written in said same storage area st said same address of said image memory.

16. The image data rotating method according to claim 14, wherein, after image data of a page is written in said image memory in a predetermined procedure, if said image data cannot be read and output outside in a procedure different from said predetermined procedure, but can be read and output outside in said predetermined procedure, it is read in said predetermined procedure.

17. An image data rotating method comprising a first process comprising the steps of:

using an image memory capable storing pixels in the same number as of the squared maximum number of the number of pixels per line of each of image data with a plurality of sizes to be rotated $m_1, m_2, m_3, \ldots$ (m being a positive integer, the subscript indicating that size is different) and the number of lines $n_1, n_2, n_3, \ldots$ (n being a positive integer, the subscript indicating that size is different and corresponds to $m_1, m_2, m_3, \ldots$ );

k pixels and k lines in the same number as one of common divisors k of said number of pixels per line $m_1, m_2, m_3, \ldots$ and said number of lines $n_1, n_2, n_3, \ldots$ (k being a positive integer) being unit number of pixels and unit number of lines in the process writing or reading said image memory;

for image data of a plurality of pages with the same size to be rotated, selecting k pixels out of $k^2$ pixels, which are read by specifying by n/k all pixels in image data of the 4j-th (j=0, 1, 2, ... ) page stored in said image memory from the first address of addresses of said image memory, from storage areas (i−1+L×k) in said address (i being a variable indicating the order of pixels to be read, i=1, 2, ... , k, L being a variable indicating the order of lines in a line group consisting of k lines which constitute the rotated image data, L=1, 2, ... , k); and writing all pixels of image data at (4j+1)-th page to be rotated every k pixels in storage areas at the same address of said specified image memory in which the selected k pixels are stored;

said writing step being repeated until said value of L exceeds k by updating the address by one every time the processes for reading and writing k pixels are completed, and returning said address to said first address every time the process is completed for one line;

a second process comprising the steps of: selecting k pixels out of $k^2$ pixels, which are read by specifying by one all pixels in image data of the (4j+1)-th page stored in said image memory from the (n/k−1)-th address of addresses of said image memory to the first address, from storage areas (i×k−L−1) in said address; and writing all pixels of image data at (4j+2)-th page to be rotated every k pixels in k storage areas at the same address of said specified image memory;

said writing step being repeated until said value of L exceeds k by updating by n/k the address every time the processes for reading and writing k pixels are completed, and returning said address to said first address every time the process is completed for one line;

a third process comprising the steps of: selecting k pixels out of $k^2$ pixels, which are read by specifying by n/k all pixels in image data of the (4j+2)-th page stored in said image memory from the $(n^2/k^2-1)$-th address of addresses of said image memory to the first address, from storage areas $\{(k-L) \times k-i\}$ in said address; and writing all pixels of image data at (4j+3)-th page to be rotated every k pixels in k storage areas at the same address of said specified image memory;

said writing step being repeated until said value of L exceeds k by reducing the address by one every time the processes for reading and writing k pixels are completed, and returning said address to said first address every time the process is completed for one line; and a fourth process comprising the steps of: selecting k pixels out of $k^2$ pixels, which are read by specifying by one all pixels in image data of the (4j+3)-th page stored in said image memory from the $\{n \times (n-k)/k^2\}$-th address of addresses of said image memory to the first address, from storage areas $\{(k-i) \times k+L\}$ in said address; and writing all pixels of image data at (4j+4)-th page to be rotated every k pixels in k storage areas at the same address of said specified image memory;

said writing step being repeated until said value of L exceeds k by reducing by n/k the address every time the processes for reading and writing k pixels are completed, and returning said address to said first address every time the process is completed for one line;

wherein, when the image data is rotated by 90 degrees, said first to said fourth processes are sequentially performed;

said fourth process being followed by said first process;

the read image data being not output in said first process if j=0;

when the image data is rotated by 180 degrees, said first and said third processes being alternately performed;

the read image data being not output in said first process if j=0;

when the image data is rotated by 270 degrees, said first, said fourth, said third, and said second processes being performed in this order;

said second process being followed by said first process;

the read image data being not output in said first process if j=0;

when image data being repeatedly not rotated and rotated by 180 degrees every other page, said first, said first, said third and said third processes being performed in this order;

said third process of the second time being followed by said first process of the first time;

the read image data being not output in said first process if j=0;

when image data being repeatedly rotated by 90 and 270 degrees every other page, said first, and said second processes being alternately performed;

the read image data being not output in said first process if j=0;

when image data being repeatedly rotated by 270 and 90 degrees every other page, said first, and said fourth processes being alternately performed;

the read image data being not output in said first process if j=0.

18. The image data rotating method according to claim 17, wherein, before said pixels are written, image synthesization is performed for pixels read from the same storage area at the same address of said image memory and pixels to be written, said synthesized image being written in said same storage area st said same address of said image memory.

19. The image data rotating method according to claim 17, wherein, after image data of a page is written in said image memory in a predetermined procedure, if said image data cannot be read and output outside in a procedure different from said predetermined procedure, but can be read and output outside in said predetermined procedure, it is read in said predetermined procedure.

20. An image data rotating apparatus comprising:

operation controller means having an image memory capable of storing pixels in the same number as the squared maximum number of the number of pixels per line of each of image data with a plurality of sizes to be rotated $m_1, m_2, m_3, \ldots$ (m being a positive integer, the subscript indicating that size is different) and the number of lines $n_1, n_2, n_3, \ldots$ (n being a positive integer, the subscript indicating that size is different and corresponds to $m_1, m_2, m_3, \ldots$), k pixels and k lines in the same number as one of common divisors k of said number of pixels per line $m_1, m_2, m_3, \ldots$ and said number of lines $n_1, n_2, n_3, \ldots$ (k being a positive integer) being unit number of pixels and unit number of lines in the process writing or reading said image memory, and generating information on size of image data to be rotated and an angle to be rotated;

a page counter for counting the number of pages for specifying which ordered page of the image data of a plurality of pages to be rotated is processed;

a line counter for counting the number of lines from 0 to (k−1) for specifying pixels on which ordered line in said line group consisting of k lines should be processed in image data of one page to be rotated;

address controller means for generating address data of said image memory from or to which pixels should be read or written based on information, said number of pages, and said number of lines supplied from said operation controller means, said page counter and said line counter; and area selection controller means for selecting k storage areas which store k pixels out of a plurality of pixels constituting image data of the former page read from an address specified by said address data of said image memory based on the information, said number of pages and said number of lines supplied from said operation controller means, said page counter and said line counter, for extracting k pixels corresponding to said areas, and for writing k pixels constituting image data to be rotated in said selected storage areas; said apparatus further having a control procedure, said control procedure consisting of a first process comprising the steps of: for image data of a plurality of pages with the same size to be rotated, selecting k pixels out of $k^2$ pixels, which are read by specifying by n/k all pixels in image data of the 4j-th (j=0, 1, 2, . . . ) page stored in said image memory from the first address of addresses of said image memory, from storage areas (i−1+L×k) in said address (i being a variable indicating the order of pixels to be read, i=1, 2, . . . , k, L being a variable indicating the order of lines in a line group consisting of k lines which constitute the rotated image data, L=1, 2, . . . , k); and writing all pixels of image data at (4j+1)-th page to be rotated every k pixels in storage areas at the same address of said specified image memory in which the selected k pixels are stored;

said writing step being repeated until said value of L exceeds k by updating the address by one every time the processes for reading and writing k pixels are completed, and returning said address to said first address every time the process is completed for one line;

a second process comprising the steps of: selecting k pixels out of $k^2$ pixels, which are read by specifying by one all pixels in image data of the (4j+1)-th page stored in said image memory from the (n/k−1)-th address of addresses of said image memory to the first address, from storage areas (i×k−L−1) in said address; and writing all pixels of image data at (4j+2)-th page to be rotated every k pixels in k storage areas at the same address of said specified image memory;

said writing step being repeated until said value of L exceeds k by updating by n/k the address every time the processes for reading and writing k pixels are completed, and returning said address to said first address every time the process is completed for one line;

a third process comprising the steps of: selecting k pixels out of $k^2$ pixels, which are read by specifying by n/k all pixels in image data of the (4j+2)-th page stored in said image memory from the $(n^2/k^2-1)$-th address of addresses of said image memory to the first address, from storage areas {(k−L)×k−i} in said address; and writing all pixels of image data at (4j+3)-th page to be rotated every k pixels in k storage areas at the same address of said specified image memory;

said writing step being repeated until said value of L exceeds k by reducing the address by one every time the processes for reading and writing k pixels are completed, and returning said address to said first address every time the process is completed for one line; and a fourth process comprising the steps of: selecting k pixels out of $k^2$ pixels, which are read by specifying by one all pixels in image data of the (4j+3)-th page stored in said image memory from the {n×(n−k)/$k^2$}-th address of addresses of said image memory to the first address, from storage areas {(k−i)×k+L} in said address; and writing all pixels of image data at (4j+4)-th page to be rotated every k pixels in k storage areas at the same address of said specified image memory;

said writing step being repeated until said value of L exceeds k by reducing the address by n/k every time the processes for reading and writing k pixels are completed, and returning said address to said first address every time the process is completed for one line;

wherein, when the image data is rotated by 90 degrees, said first to said fourth processes are sequentially performed;

said fourth process being followed by said first process;

the read image data being not output in said first process if j=0;

when the image data is rotated by 180 degrees, said first and said third processes being alternately performed;

the read image data being not output in said first process if j=0;

when the image data is rotated by 270 degrees, said first, said fourth, said third, and said second processes being performed in this order;

wherein said second process is followed by said first process, the read image data being not output in said first process if j=0;

when image data being repeatedly not rotated and rotated by 180 degrees every other page, said first, said first, said third and said third processes being performed in this order;

said third process of the second time being followed by said first process of the first time;

the read image data being not output in said first process if j=0;

when image data being repeatedly rotated by 90 and 270 degrees every other page, said first and said second processes being alternately performed;

the read image data being not output in said first process if j=0;

when image data being repeatedly rotated by 270 and 90 degrees every other page, said first and said fourth processes being alternately performed;

the read image data being not output in said first process if j=0.

21. The image data rotating apparatus according to claim 20, wherein before said pixels are written, said area selection controller means performs image synthesization for pixels extracted from the same storage area at the same address of said image memory and pixels to be written, and writes said synthesized image in said same storage area at said same address of said image memory.

22. The image data rotating apparatus according to claim 21, further comprising memory managing means for securing minimum memory capacity necessary for said image data when rotating said image data out of the entire memory capacity of said image memory.

23. The image data rotating apparatus according to claim 20, further comprising memory managing means for securing minimum memory capacity necessary for said image data when rotating said image data out of the entire memory capacity of said image memory.

* * * * *